United States Patent

[11] 3,594,549

[72] Inventors Alan I. Frank
Philadelphia;
Stanley M. Oster, Blue Bell, both of, Pa.
[21] Appl. No. 734,777
[22] Filed June 5, 1968
[45] Patented July 20, 1971
[73] Assignee Scan-Data Corporation
Norristown, Pa.

[54] DOCUMENT HANDLER
13 Claims, 27 Drawing Figs.

[52] U.S. Cl. 235/61.11E, 271/10, 271/36
[51] Int. Cl. G06k 7/14, B65h 5/08, B65k 3/06
[50] Field of Search 271/26, 74, 75, 10, 36; 235/61.12, 61.115, 61.63, 61.117

[56] References Cited

UNITED STATES PATENTS

| | | | |
|---|---|---|---|
| 2,079,422 | 5/1937 | Rabenda | 235/61.64 |
| 2,572,304 | 10/1951 | Beyer | 271/10 |
| 3,044,770 | 7/1962 | Breuers | 271/36 |
| 3,052,465 | 9/1962 | David | 271/36 |
| 3,108,694 | 10/1963 | Crain et al. | 340/149 A |
| 3,203,693 | 8/1965 | Pfleger | 271/10 |
| 3,384,250 | 5/1968 | Vanhentenrijk | 271/26 X |
| 3,419,264 | 12/1968 | Gardner | 271/74 X |

*Primary Examiner*—Daryl W. Cook
*Assistant Examiner*—Robert M. Kilgore
*Attorney*—Caesar, Rivise, Bernstein & Cohen

ABSTRACT: A document handler for character recognition systems. The document handler comprises an input bin for insertion of documents, transport means for carrying the documents and an output bin for the reception of documents from the transport means. Means for sensing a document are provided adjacent the transport means for determining the location of the document on the transport means. The character recognition system includes means for reading the document at a predetermined location relative to the transport means. The movement of the transport means is controlled in accordance with the information generated by the sensing means and the character recognition system to maximize the speed of handling of the document and reading thereof.

INVENTORS.
ALAN I. FRANK
STANLEY M. OSTER
BY
Caesar, Rivise, Bernstein & Cohen
ATTORNEYS.

INVENTORS.
ALAN I. FRANK
STANLEY M. OSTER
BY
Caesar, Rivise,
Bernstein & Cohen
ATTORNEYS.

PATENTED JUL 20 1971 3,594,549

INVENTORS.
ALAN I. FRANK
STANLEY M. OSTER
BY
Caesar, Rivise, Bernstein & Cohen
ATTORNEYS.

PATENTED JUL 20 1971 3,594,549

SHEET 04 OF 13

INVENTORS.
ALAN I. FRANK
STANLEY M. OSTER
BY
Caesar, Rivise, Bernstein & Cohen
ATTORNEYS.

INVENTORS.
ALAN I. FRANK
STANLEY M. OSTER
BY
Caesar, Rivise, Bernstein & Cohen
ATTORNEYS.

INVENTORS.
ALAN I. FRANK
STANLEY M. OSTER
BY
Caesar, Rivise, Bernstein & Cohen
ATTORNEYS.

INVENTORS.
ALAN I. FRANK
STANLEY M. OSTER
BY
Caesar, Rivise,
Bernstein & Cohen
ATTORNEYS.

INVENTORS.
ALAN I. FRANK
STANLEY M. OSTER
BY
Caesar, Rivise, Bernstein & Cohen
ATTORNEYS.

INVENTORS.
ALAN I. FRANK
STANLEY M. OSTER
BY
Caesar, Rivise, Bernstein & Cohen
ATTORNEYS.

INVENTORS.
ALAN I. FRANK
STANLEY M. OSTER
BY
Caesar, Rivise,
Bernstein & Cohen
ATTORNEYS.

INVENTORS.
ALAN I. FRANK
STANLEY M. OSTER
BY
Caesar, Rivise, Bernstein & Cohen
ATTORNEYS.

INVENTORS.
ALAN I. FRANK
STANLEY M. OSTER
BY
Caesar, Rivise, Bernstein & Cohen
ATTORNEYS.

INVENTORS.
ALAN I. FRANK
STANLEY M. OSTER
BY
Caesar, Rivise, Bernstein & Cohen
ATTORNEYS.

DOCUMENT HANDLER

This invention relates generally to character recognition systems and more particularly to a document handler for transporting a document from the input bin of the character recognition system past the reading head of the character recognition system and into an output bin.

Document handlers for heretofore existing character recognition systems typically utilize a transport means for the documents which is fixed in speed as well as the amount of movement per unit of time and which acts independently of the control system for the character recognition system. Consequently, the character-sensing portion of the character recognition system must be capable of scanning a large area so that no portion of the document is missed. Moreover, the character recognition system is not used as efficiently as it is possible in that the movement of the transport means is fixed. That is, if it is determined from the information on the document that only the top two lines and the bottom two lines of a document need be scanned, a long period of time elapses in a fixed movement transport means between the time that the document is moved from a position between the second line and the third line. This is so because the speed of the transport means is slow enough so that the character sensor can read all of the lines on the document if they are closely spaced. Therefore, there is the long delay between the scanning of the second and third lines of the document because the movement of the conventional transport means continues slowly since there is no control over the transport means by the character recognition system.

Another difficulty encountered in prior document handlers for character recognition systems is the inability of the document handler to accept varying sizes of thicknesses of documents. Thus, if a document of 0.006 (six-thousandths) inch in thickness is a typical size of document that is to be read by the character recognition system, the conventional character recognition system will not have a document handler which is capable of accepting a/0.003 (three-thousandths) inch thickness sheet of paper of document without making major internal adjustments.

It is therefore an object of the invention to overcome the aforementioned disadvantages.

Another object of the invention is to provide a new and improved document handler for a character recognition system which is controlled by the character recognition system as a document progresses through the document handler.

Another object of the invention is to provide a new and improved document handler which may be moved in accordance with the information generated as to the location of the document on the document handler and the information on the document itself.

Another object of the invention is to provide a new and improved document handler which is capable of handling a large range of thicknesses of documents.

Yet another object of the invention is to provide a new and improved document handler that is capable of taking advantage of the high reading speeds of character recognition systems.

Still another object of the invention is to provide a new and improved document handler which increases the number of documents handled by a character recognition system.

Accordingly, a document handler is provided which includes an incrementally advancing belt which transports documents which are to be read from an input bin past a reading window for a character recognition system and then into an output bin. The incremental advancement of the belt is controlled by a computer which is fed information by the character recognition system and the position sensors provided in the document handler. Vacuum pressure is provided beneath the belt for enabling securement of the document to the belt as the belt moves so that the document maintains its original alignment with respect to the belt from the input to the output bin via the reading window.

The aforementioned objects and further objects of the invention are achieved by providing a document handler for a character recognition system which comprises an input bin for insertion of documents, transport means for carrying the documents, an output bin for reception of the documents from the transport means and means for sensing the location of the documents on the transport means. The character recognition system includes means for reading the document at a predetermined location relative to the transport means. The movement of the transport means is controlled in accordance with the information generated by the sensing means and the character recognition system for transporting a document from the input bin to the output bin.

Other objects and many of the attendant advantages of this invention will be readily appreciated as the same becomes better understood by reference to the following detailed description when considered in connection with the accompanying drawings wherein.

Referring now in greater detail to the various figures of the drawing wherein similar reference characters refer to similar parts, a character recognition system is shown generally at 30 in FIG. 1.

The character recognition system is embodied in a generally rectangular housing 32. The documents which are to be read by the character recognition system are inserted into the character recognition system in input bin 34. The documents that have been read are received at output bin 36. A document handler transfers the documents from the input bin 34 to output bin 36.

Figure 2A:
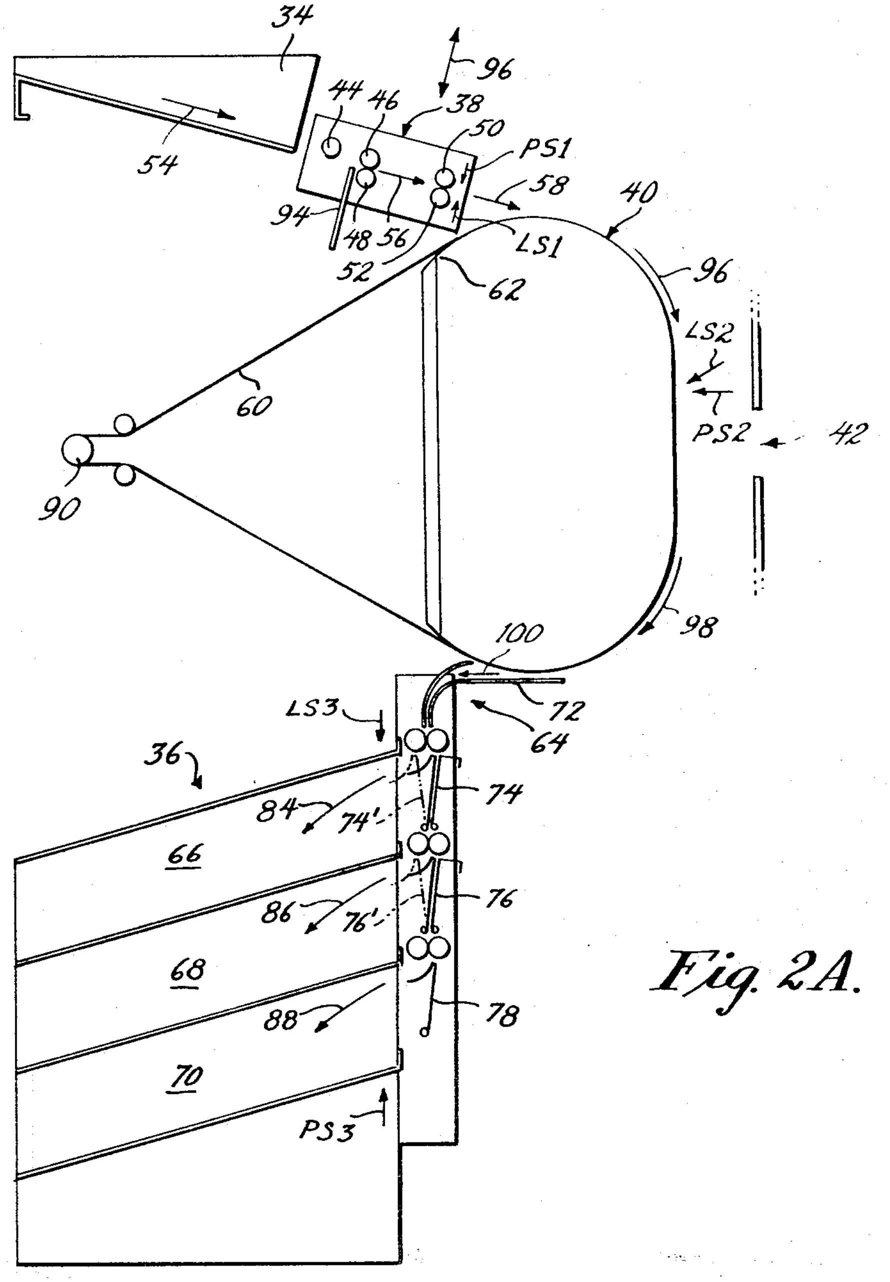
FIG. 2A is a diagrammatic side elevational view of the document handler with portions deleted to clarify illustration of the operation of the document handler and the flow of a document therein.
Figure 2B:
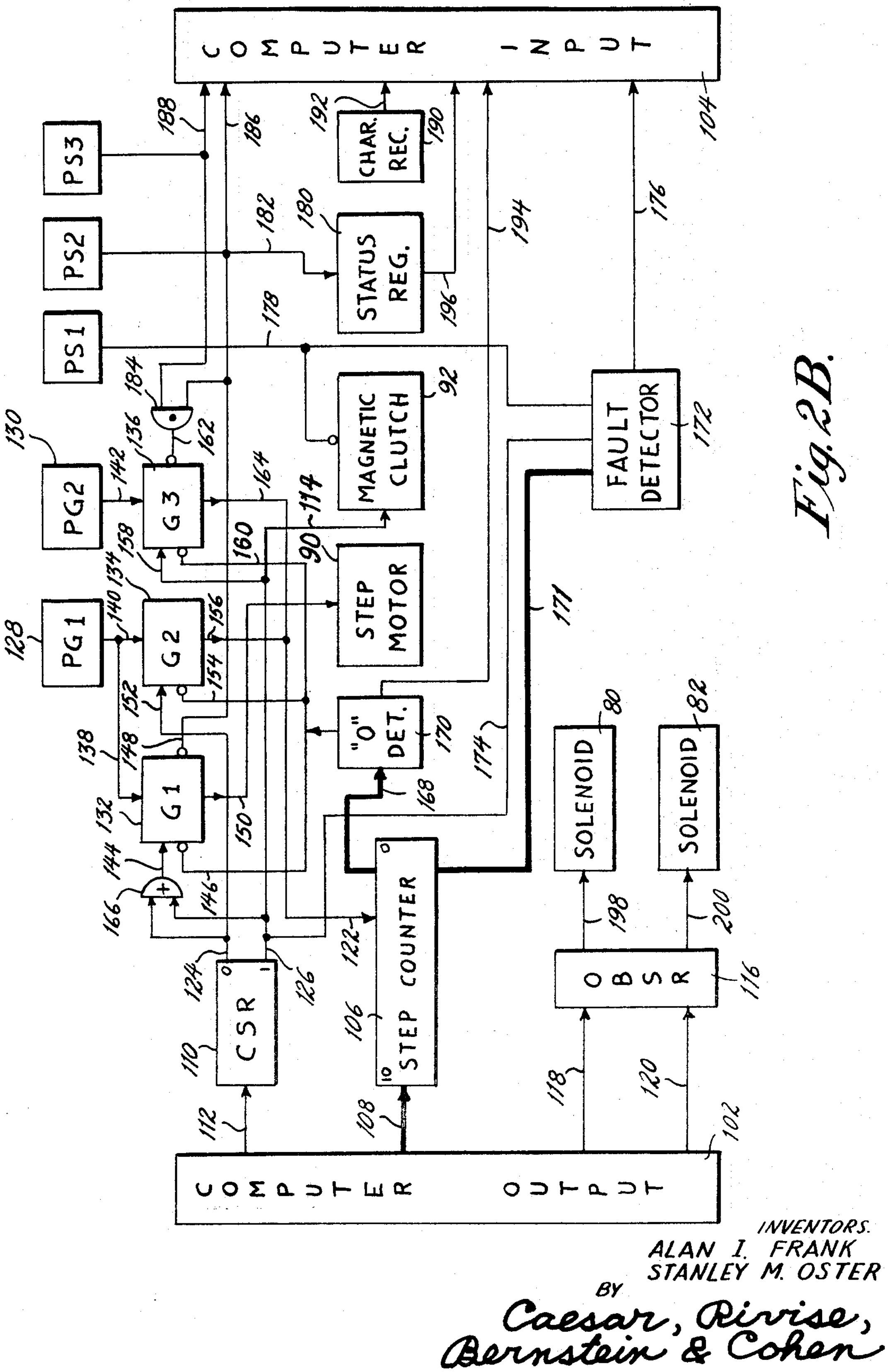
FIG. 2B is a schematic block diagram illustrating the operation of the control system utilized for controlling the transport means of the document handler.

The operation of the document handler is diagrammatically illustrated in FIGS. 2A and 2B. FIG. 2A is a diagrammatic illustration of the document handler with portions removed to show the flow of the documents which are read by the character recognition system and FIG. 2B is a schematic diagram of the electrical operation for controlling the document handler during the transfer of documents.

As best seen in FIG. 2A, the document handler of the character recognition system basically comprises input bin 34, an input feed section 38, a transport member 40, a read window 42 and output bin 36. The input feed section 38 is provided adjacent the input bin 34 and includes a plurality of rotatable shafts 44, 46, 48, 50 and 52. The shafts 44 through 52 include peripheral members which frictionally engage documents. The shafts are thus adapted to feed one document from the document bin 34 at a time in the directions of arrows 54, 56 and 58 to the transport member 40.

The transport member 40 basically comprises a belt 60 which is movable about a platen 62. The document is moved in controlled increments on belt 60 past the read window 42 and into an output gating section 64 which gates the documents to one of three sections 66, 68 and 70 of output bin 36. As will hereinafter be seen in greater detail, the belt 60 includes perforations throughout to enable reduced pressure provided within the platen 62 to secure the document to the belt 60 as the document is moved from the input feed section 38 to the output bin 36.

Gating section 64 includes a chute 72 for guiding documents to a plurality of gates 74, 76 and 78. Gates 74 and 76 are controlled by solenoids 80 and 82, respectively, which are diagrammatically shown in FIG. 2B. Gate 74 is normally in the position shown in full line in FIG. 2A. Solenoid 80, when energized, is adapted to move a portion of the gate 74 to the position shown in phantom in FIG. 2A at 74'. In its normal position, gate 74 is adapted to guide the document in the direction of arrow 84 into section 66 of the output bin 36. If, however, the solenoid 80 is energized, the gating section 74 is moved to the position shown at 74' and forms a chute to direct the document into gating section 76.

Gating section 76 is normally in the position shown in full line in FIG. 2A. If solenoid 82 is energized, a portion of the gate 76 is drawn to the position shown in phantom at 76' in FIG. 2A. When gate 76 is in the position shown in full line, if the document has been gated to gate 76, gate 76 directs the document in the direction of arrow 86 into section 68 of the output bin. Where solenoid 82 is energized the portion of gate 76 is drawn into the position at 76' and forms a chute for directing the document towards gate 78. Gate 78 is immovable and whenever the document is moved downwardly through gate 76 to gate 78, the document is directed in the direction of arrow 88 into section 70 of the output bin.

The belt 60 of the transport member 40 is stepped sequentially by a step motor 90, the shaft of which frictionally engages and moves the belt 60 about the platen 62.

Shafts 44, 46, 48, 50 and 52 of the input feed section are driven by a gear motor. As will be seen hereinafter, the gear motor is connected directly to shafts 50 and 52 to cause continuous rotation of the shafts 50 and 52. Shaft 50 is rotated in a counterclockwise direction as seen in FIG. 2A and shaft 52 rotates in a clockwise direction as seen in FIG. 2A. Shafts 44, 46 and 48 are connected to the gear motor via a magnetic clutch 92 FIG. 2B) which causes selective connection of the shafts 44, 46 and 48 to the gear motor. The shaft 44 is rotated in a counterclockwise direction as seen in FIG. 2A and rests upon the top sheet of the pile of documents in bin 34.

The input feed section 38 also includes an input paper feed stop 94 which acts as the front wall of the input bin 34. The entire input feed section 38 is adapted to move up and down in the direction of arrows 96 in accordance with the height of the pile of documents in the input bin 34. The paper feed stop 34 is thus adapted to expose the top sheet of the pile of documents. Thus, the counterclockwise rotation of shaft 44 when it is moved causes the top sheet of the document pile to be urged in the direction of arrow 56.

The shaft 46 and the shaft 48 are both rotated counterclockwise by the magnet clutch as seen in FIG. 2A. Thus, shaft 46 continues to urge the top document in the pile in the direction of arrow 56; whereas, the counterclockwise rotation of shaft 48 tends to urge the document back towards the input bin. Thus, if two documents are driven past the paper feed stop 94 by the shaft 44, the shaft 48 prevents more than the top document from being urged in the direction of arrow 56. That is, the lower of the two documents is engaged only by shaft 48 and is therefore urged rearwardly by the counterclockwise rotation of shaft 48.

The top document is thus fed between the shafts 50 and 52 which are rotating counterclockwise and clockwise, respectively, to pass the page in the direction of arrow 58. As the top document passes through shafts 50 and 52, the position of the document is sensed by a light source and photosensor which are shown as arrows in FIG. 2A and labeled LSI and PS1, respectively. The direction of the arrows represents the direction in which the light source and photosensor face.

As the document progresses in the direction of arrow 58 and arrow 96, the document is then sensed by a second light source and photosensor which are represented as arrows in FIG. 2A and labeled LS2 and PS2, respectively, which indicate the direction which the light source and photosensor face.

The first and second photosensor are represented as the blocks labeled PS1 and PS2 in FIG. 2B. Light source LS2 is aimed at the belt 60 which as will hereinafter be seen is a black body, and photosensor PS2 is directed at the same position on the belt 60. The position on the belt which LS2 and PS2 are directed is located adjacent the top of window 42. Thus, when the leading edge of the document passes the position at which light source LS2 is pointed, the change in reflected light is sensed by the photosensor PS2. At this point, a second sequence of movements of the belt 60 is initiated.

The document is moved by belt 60 through the read window 42 in the direction of arrow 98 towards the input chute 72 of the gating section 64. As seen, as the document passes out of the read window 42, the character recognition circuitry senses this condition and returns the movement of the transport member to its original cycle of operation. The document proceeds in the direction of arrow 98 and arrow 100 into gating section 64 and as it is passed into the output bin 36, a third photosensor and light source depicted as arrows LS3 and PS3 sense the entry of a document into any one of the sections 66 through 70 of the output bin 36.

FIG. 2B illustrates the control circuitry for the document handler. In addition to the step motor 90, magnetic clutch 92, solenoids 80 and 82 and photosensors PS1, PS2 and PS3, which were discussed in connection with FIG. 2A, the control system for the document handler includes the computer of the character recognition system which is shown in two parts in FIG. 2B as the computer output 102 and the computer input 104, respectively.

The computer output 102 is connected to a step counter 106 via cable 108, a cycle select register (CSR) 110 via line 112 and an output bin select register (OBSR) 116 via lines 118 and 120.

Step counter 106 basically comprises an eleven-stage binary counter which is preset via the information provided on the lines of cable 108 from the computer output. The step counter 106 includes an input line 122 which steps down the counter each time an input pulse is received.

The cycle select register 110 basically comprises a bistable storage element having a 0 output line 124 and a 1 output line 126. When a 1 bit is placed by the computer output into the cycle select register 110, the cycle select register provides information to the remaining circuitry to indicate a feed cycle for transporting a document from the input bin to the read window 42 and a document from the read window to the output bin.

When the computer output places a 0 bit in the cycle select register 110, the cycle select register determines a line increment cycle which enables movement of the document line by line past the read window 42. A pair of pulse generators (PG1) 128 and (PG2) 130 provide stepping pulses to the step counter 106 and step motor 90 for both reducing the count in the step counter 106 and advancing the step motor 90.

PG1 and PG2 are connected via gates G1, G2 and G3 (132, 134 and 136, respectively) to the step counter 106 and the step motor 90. PG1 is connected to the input lines 138 and 140 of gates (G1) 132 and (G2) 134, respectively. PG2 is connected to the input line 142 of gate (G3) 136. G1 includes an enabling input line 144 and disabling input lines 146 and 148. The enabling input lines to the gates are represented by an arrow and disabling input lines are represented by a circle at the end of the input lines throughout the circuitry in FIG. 2B. Gate G1 is connected via output line 150 to step motor 90. G2 includes an enabling input line 152 and a disabling input line 154. G2 is connected via output line 156 to input line 122 of the step counter 106. G3 includes an enabling input line 153 and disabling input lines 160 and 162. G3 is connected via its output line 164 to input line 122 of step counter 106.

Gates G1, G2 and G3 each operate in a similar manner. The pulses from the pulse generators PG1 and PG2 which are provided at the input lines to the gates are not passed by the gates to the output lines 150, 156 and 164 unless one of the enabling input lines is energized. Thus, if the case of gate G1, the pulses provided on line 138 are not passed to output line 150 unless the line 144 is energized. However, should either line 146 or 148 of gate G1 be energized, the gate is disabled notwithstanding an enabling input on line 144. Thus, the gates pass pulses from the pulse generators only when the gates are enabled by an energizing input on the enabling input line. However, the gates do not pass pulses if both the enabling input line and any one of the disabling input lines is energized, nor do the gates pass a pulse if either one or both of the disabling input lines are energized and the enabling inputs are not energized.

The cycle select register 110 is connected via output line 124 to a first input or an OR gate 166 and the enabling input line 152 of G2. Output line 126 of the cycle select register 110 is connected to a second input or OR gate 166 and to enabling input line 158 of G3. Output line 126 is also connected to magnetic clutch 92 via enabling input line 114 and to fault detector 172 via line 174. The output line of OR gate 166 is connected to enabling input line 144 of G1. Gate 166 is a conventional OR gate and provides an enabling signal on line 144 if either one of its inputs is energized. It can therefore be seen that gate G1 is enabled during both feed and line increment cycles since either line 124 or line 126 is energized by cycle select register 110 which is a bistable device. Therefore, in both feed and line increment cycles of operation, pulses from PG1 are provided to step motor 90.

G2 is enabled when the cycle select register has a 0 bit therein and thus enables pulses from PG1 to be passed to the step counter 106 when there is a line increment cycle because the 0 bit stored in the cycle select register 110 causes energization of line 124. G3 is enabled by the cycle select register when a 1 bit is stored therein which determines a feed cycle, and pulses are thereby fed from PG2 to the step counter 122 during the feed cycle.

It can therefore be seen that during a feed cycle, step motor 90 is stepped by pulses from PG1, step counter 106 is stepped by pulses from PG2 and magnetic clutch 92 is energized. During a line increment cycle, both the step motor and the step counter are stepped by pulses from PG1.

The step counter 106 is connected via an output cable 168 to a "0" detector. The "0" detector 170 comprises a gate which recognizes a 0bit in all of the stages of the step counter 106. The "0" detector 170 is connected to the disabling input lines 146, 154 and 160 of gates G1, G2 and G3, respectively. When a 000... condition is recognized in the step counter 106, the "0" detector disables each of the gates G1, G2 and G3 to prevent further passage of pulses from PG1 and PG2 to either the step counter or the step motor 90. The step counter 106 is connected via output cable 171 to fault detector 172.

As set forth above, output line 126 of cycle select register 110 is connected via line 174 to the fault detector 172. The output of the fault detector is connected via input line 176 to the computer input 104. The photosensor PS1 is connected via line 178 to a disabling input line of the magnetic clutch 92, and to fault detector 172. Photosensor PS2 is connected to a status register 180 via line 182, to the input of an AND gate 184 and via line 186 to computer input 104. The third photosensor PS3 is connected to the other input of AND gate 184 and to an input line 188 of computer input 104. The character recognition circuitry 190 is connected via input cable 192 to the computer input 104.

AND gate 184 is connected to the disabling input 162 of G3. G3 is disabled when both PS2 and PS3 have detected documents. That is, AND gate 184 energizes output line 162 only when both input lines thereof are energized. PS1, PS2 and PS3 energize their respective output lines only upon detecting a document in the document handler. Therefore, when both PS2 and PS3 detect documents, step counter 106 stops receiving pulses to step the counter down. As will hereinafter be seen, should PS2 and PS3 fail to be energized, it is an indication that a document has failed to pass the location adjacent photosensors PS2 and PS3. In such a case, the step counter continues to be stepped down during the feed cycle. When the step counter reaches a predetermined count, fault detector 172 detects the condition to indicate a paper fault in the document handler in either the input or output portion of the feed cycle.

To start the operation of the document handler, the computer output provides a 1 on line 112 to the cycle select register 110 which thereby causes the enabling of gates G1 and G3. CSR 110 also provides an enabling signal via line 114 to energize the magnetic clutch 92. At the same time, the computer output 102 provides on cable 108 a 1 on each line thereof thereby providing step counter 106 with a 1 in each stage of the step counter. The enabling of gates G1 and G3 causes pulses generated by PG1 to pulse step motor 90 which thereby causes the belt 60 to move about the platen 62 and pulses generated by PG2 to step down counter 106. The energization of magnetic clutch 92 causes the shafts 44, 46 and 48 to rotate. Shaft 44 draws the document in the direction of arrows 56 past shafts 50 and 52 causing the photosensor PS1 to detect a leading edge of the document. The photosensor PS1 provides a signal on line 178 which disables the magnetic clutch 92 thereby causing the disconnection of the gear motor from shafts 44, 46 and 48 and prevents a second document from following the first document.

The document is transmitted to the belt 60 by the continuously rotating shafts 50 and 52 and the document starts to travel along the belt 60 in the direction of arrow 96. When the document reaches light source LS2 and photosensor PS2, the photosensor PS2 provides a signal which is transmitted via line 186 to the computer input and which is also transmitted to line 148 of gate G1. The signal on line 148 thereby disables the gate and prevents further pulses from PG1 to step the motor 90 and thus stops the belt 60 of transport member 40. The status register 180 detects the signal from PS2 on line 182. The computer receives on line 196 the signal representative of the status of register 196 which causes the computer to generate on line 112 a 0 bit which causes the cycle select register 110 to be changed in state so that an energizing signal is provided on the 0 output line 124.

The computer output provides on cable 108 a predetermined number which is inserted in the step counter 106 which corresponds to the distance that the document is to be moved during each increment. That is, for each step of the motor 90 (i.e. each time the motor receives a pulse), the belt 60 preferably advances 0.005 inch. The motor continues to be stepped until the count in the step counter is 000.

Since in a line increment cycle (as determined by a 0 in the cycle select register 110) the step motor and the step counter are each stepped simultaneously by the pulse generator PG1, the number inserted in the step counter determines the number of 0.005 inch increments that the motor 90 moves the belt 60 during a line increment cycle. Thus, if the number placed in the step counter is equivalent to a decimal 10, the belt 60 moves the document 0.05 inch (0.005 x 10). For example, if the number placed in the step counter is equivalent to the decimal 20, the cycle select register 110 enables 20 pulses to be passed via line 150 to step motor 90 thereby causing the step motor to move belt 60 20 times an increment of 0.005 inch.

At the same time, the gate G2 enables the counter 106 to be stepped down 20 times. This causes the count in step counter 106 to be 00. The "0" detector 170 detects this condition and provides via line 194, an interrupt signal to the computer input 104 which indicates that the paper advance for the line increment is completed.

It can therefore be seen that if the documents have lines that are spaced 0.1 inch apart, the character recognition system in conjunction with the computer provides the binary equivalent of decimal 20 to the step counter 106 after the character recognition system has scanned the first line. The step motor is stepped 20 times and the belt 60 is moved 0.1 inch. The character recognition system then scans the next line.

The computer is now ready to provide either another line increment instruction or a feed cycle instruction. If there are further lines which must be read on the document, the computer provides another increment cycle. If, however, the last line of the document has been read, the computer provides a feed cycle instruction.

Assuming that the line increment cycles have been completed, the computer output provides a 1 on line 112 which is inserted in the cycle select register 110 to start another feed cycle. Simultaneously, eleven 1's are placed in the 11 stages of the step counter 106.

The feed cycle input accomplishes two purposes, it transfers the document which is just leaving the read window to the output bin 36 and enables the transfer of the next document from the input bin 34 to the read window. Pulses are then fed from PG1 to the step motor 90 advancing the belt 60 0.005 inch for every pulse. The magnetic clutch 92 is again energized by a signal on line 114 which causes the shafts 44, 46 and 48 to be energized and rotate thereby driving the top document in the input bin 34 in the direction of arrows 54 and 56 towards the belt 60. Pulses are also fed from PG2 to the step counter 106 which steps the counter in a downward direction, one count for every pulse.

In the input cycle, the top document of the input bin 34 is fed to the transport member 40. When the leading edge of the input document is fed between shafts 50 and 52, it interrupts the light from LS1 to PS1. The photosensor PS1 causes the magnetic clutch 92 to be disabled which thereby disengages the gear motor from the shafts 44, 46 and 48. The document continues to be fed towards the belt 60 by shafts 50 and 52 and the termination of rotation of shafts 44, 46 and 48 prevents the next document from following.

The shafts 50 and 52 cause the second document to be placed onto the belt 60 which is moved incrementally by step motor 90 as it is stepped by pulse generator PG1. When the leading edge of the document arrives at the location of photosensor PS2, the light from LS2 is reflected into the photosensor. Movement of the belt 60 is terminated since PS2 generates a disabling signal to G1 which terminates the step pulses from PG1 to the step motor 90. As will hereinafter be seen, the document which is in the output portion of the feed cycle has been deposited in one of the sections 66, 68 or 70 of the output bin by this time. Therefore, the pulses from the pulse generator PG2 to step counter 106 are discontinued to prevent the further stepping down of the count therein. The pulses to step counter 106 are prevented by both of the photosensors PS2 and PS3 being energized and causing AND gate 184 to disable G3. If both PS2 and PS3 are not energized, the counter 106 continues to be stepped down by pulses from PG2. When a predetermined count is reached, the fault detector senses the condition and indicates a paper fault.

After PS2 detects the leading edge of the document in the input portion of the feed cycle, the status register 180 is signalled by photosensor PS2 and provides a signal via input line 196 to the computer input 104 which causes the computer to generate a line increment instruction which moves the document into the read window 42 and thereby enables the first line of the document to be read. The line increment instructions are then continued until the document has passed the read window and/or the last line of the document has been read.

At the same time that the input cycle is begun, the output cycle is also initiated in which the document in the read window is moved to the output bin 36. When the document reaches the output bin section, it is directed by the output gates 74 and 76 into the output bin determined by the output bin select register 116. The output bin select register receives signals on lines 118 and 120 from the computer after the document has been read.

For example, if the criterion for bin selection is the quality of the material on a document, the computer and/or the character recognition circuitry makes a decision based on the information read at the read window and provides signals via lines 118 and 120 from the computer output which indicative of the quality of the material. The documents that are of good quality are placed in section 66 of bin 36, the documents of medium quality are placed in section 68 of bin 36 and the documents of poor quality are placed in section 70 of bin 36. The information provided on lines 118 and 120 corresponds to the quality determination and enables the output bin select register 116 to gate the document to the proper section.

Where the document read at the read window is of good quality, the computer output provides 0 signals on both lines 118 and 120. The output bin select register, which is preferably comprised of a two-stage bistable storage device, thereby stores a 0 in both stages of the register. The output bin select register is connected via lines 198 and 200, respectively, to solenoids 80 and 82. When a 0 is stored in either stage of the output bin select register, the output line associated therewith is not energized. If, however, a 1 is placed in the output bin select register stage and the output line associated therewith is energized, the solenoid associated with the output line causes the gate to move to the position shown in phantom in FIG. 2A.

Thus, where the quality of the document has been determined to be good by the computer, the output signals provided on lines 118 and 120 are representative of a 0 thereby causing a 0 to be placed in each stage of the output bin select register 116. Lines 198 and 200 do not energize either solenoid 80 or solenoid 82 and the document is thus gated by gate 74 into section 66 of the output bin 36. When the computer determines that the quality of the document read is medium, the computer provides from the computer output a 1 signal on line 118 and a 0 signal on line 120. The first stage of the output bin select register 116 stores a 1 and the second stage stores a 0. Thus, only line 198 is energized thereby energizing solenoid 80 which causes the gate 74 to move to the position shown in phantom at 74' in FIG. 2A. The gate thereby passes the document to gate 76 which is in the position shown in full line in FIG. 2A. The document is therefore gated into section 68 in the direction of arrow 86.

Where the document has been determined to be of poor quality by the computer, the computer provides at its output 102 on both lines 118 and 120, a 1 . Thus, both stages of the output bin select register are in the 1 state. Lines 198 and 200 are thereby both energized causing both solenoids 80 and 82 to be energized. Gates 74 and 76 are thus both caused to move to the position shown in phantom at 74' and 76', respectively, in FIG. 2A causing the document to be fed through gates 74 and 76 to gate 78 in the direction of arrow 88 and into section 70 of the output bin 36.

In order to determine paper-handling problems, a fault detector 172 is provided. The fault detector is provided to determine whether documents have properly reached the points in the cycle in a predetermined period of time. The fault detector is necessary in that in any paper-handling system, it is possible for paper-handling faults to occur. When a feed cycle is initiated, the top document in the input bin is driven through the shafts 44 through 52 onto the transport member 40. A fixed time interval is allowed for the document to reach the photosensor PS1. If the document does not reach the photosensor in the allowed time, then a paper fault is assumed.

The magnetic clutch 92 is therefore disengaged and the shafts 44, 46 and 48 are stopped. The belt cannot stop until the document which is in the read window is exited to one of the sections of the output bin. The document reaching the output bin is signalled by the completion of the output cycle and the energization of photosensor PS3.

Because the step counter 106 is provided, a means for timing the document from the input bin to photosensor PS1 is available. Since the step counter 106 is counted or stepped down by periodic pulses from the pulse generator PG2 during a feed cycle, a given number of pulses correspond to a given time interval. Therefore, if the document has not arrived at the photosensor PS1 before the step counter has counted down to a predetermined number, an input fault is ascertained.

The fault detector 172 includes a comparator to determine whether the predetermined count has been reached in the step counter 106. Where the predetermined count has been reached and the line 174 from the cycle select register is energized indicating that a feed cycle is in operation, and line 178 from PS1 is not energized, which indicates that the leading edge of the document has not yet been received, the fault detector 172 provides a signal on line 176 indicative of a fault in the input cycle. The fault detector causes a stop of the operation of the input feed section of the document handler and thereby enables an operator to get into the machine to correct the paper fault.

The fault detector is also utilized to turn off the machine after the last document has been read. That is, if the last document in the input bin has been sent to read window 42, the start of the next feed cycle causes the last document to be fed to the output bin from the read window. Since there are no further documents in the input bin, no document reaches photosensor PS1 and the step counter therefore reaches the predetermined count. After the last document has reached output bin 36 and the leading edge thereof is sensed by PS3, the fault detector causes the computer to stop the operation of the machine. The character recognition system is not started again until further documents are placed in input bin 34.

Ordinarily, the document in the output cycle going through the read window to the output bin reaches the output bin before the entering document in the input cycle reaches the photosensor PS2. There are some cases where the exiting document reaches the output bin shortly after the detection of the entering document on the photosensor PS2. To allow for this condition, the pulse repetition rate of the pulse generator PG2 is lessened such that an entering document reaches the photosensor PS2 before the step counter counts to 0. If an output cycle is not completed at the time of detection of a document by photosensor PS2, the step counter continues to count down. If the output cycle is not completed by the time that the step counter reaches 0, then an output paper fault is assumed. The fault detector detects the 0 condition in the step counter and the fact that the computer is in a feed cycle and provides a signal on line 176 to the computer which determines that a paper fault has been detected in the output cycle.

It can therefore be seen that the document handler including the transport member for the document is completely controlled by the computer for the character recognition system and control circuitry associated therewith. The movement of the document is sensed by photosensors PS1, PS2 and PS3 which determine the location of the document on the transport member 40.

The computer system controls the transport member in two modes, a feed cycle mode which moves a document from the input bin to the read window and a document which has just passed the read window to the output bin. When a document is in the read window, the computer controls the movement of the document past the optical scanner of the character recognition system. Thus, the spacing between lines of a document is determined by the character recognition system and the document is moved by the belt 60 the space of one line after each line has been scanned. The optical scanner can thus scan on the same level for each line on the document. Moreover, the reading of an instruction in a first portion of the document can enable the computer to control the movement of the document past irrelevant or unimportant information on the remainder of the document. Yet another advantage of the computer-controlled transport member is the ability of the controller to stop the transport member at any position to prevent a document from passing through the read window without the character recognition system being able to read the contents thereof.

The belt 60 of the transport member is an endless loop and is comprised of a flexible material so that it can conform to the outer surface of the platen 62. As will hereinafter be seen in greater detail, the belt is perforated along the entire length thereof so that a partial vacuum formed in the platen causes the document to be secured to the belt along its path between the input bin and the output bin. The document is therefore tightly held against the belt as it is moved from input bin 34 to output bin 36.

The output bin select register enables a document to be stored or separated into a plurality of positions as determined by the information on the document itself. The character recognition system is thus able to sort documents in accordance with the information on the documents. The use of the step counter 106 is an interface between the computer output and the control of the movement of the belt enables the step counter to also be utilized as a timer to detect paper faults through the system as well as terminate operation after the last document has been read.

Figure 1:
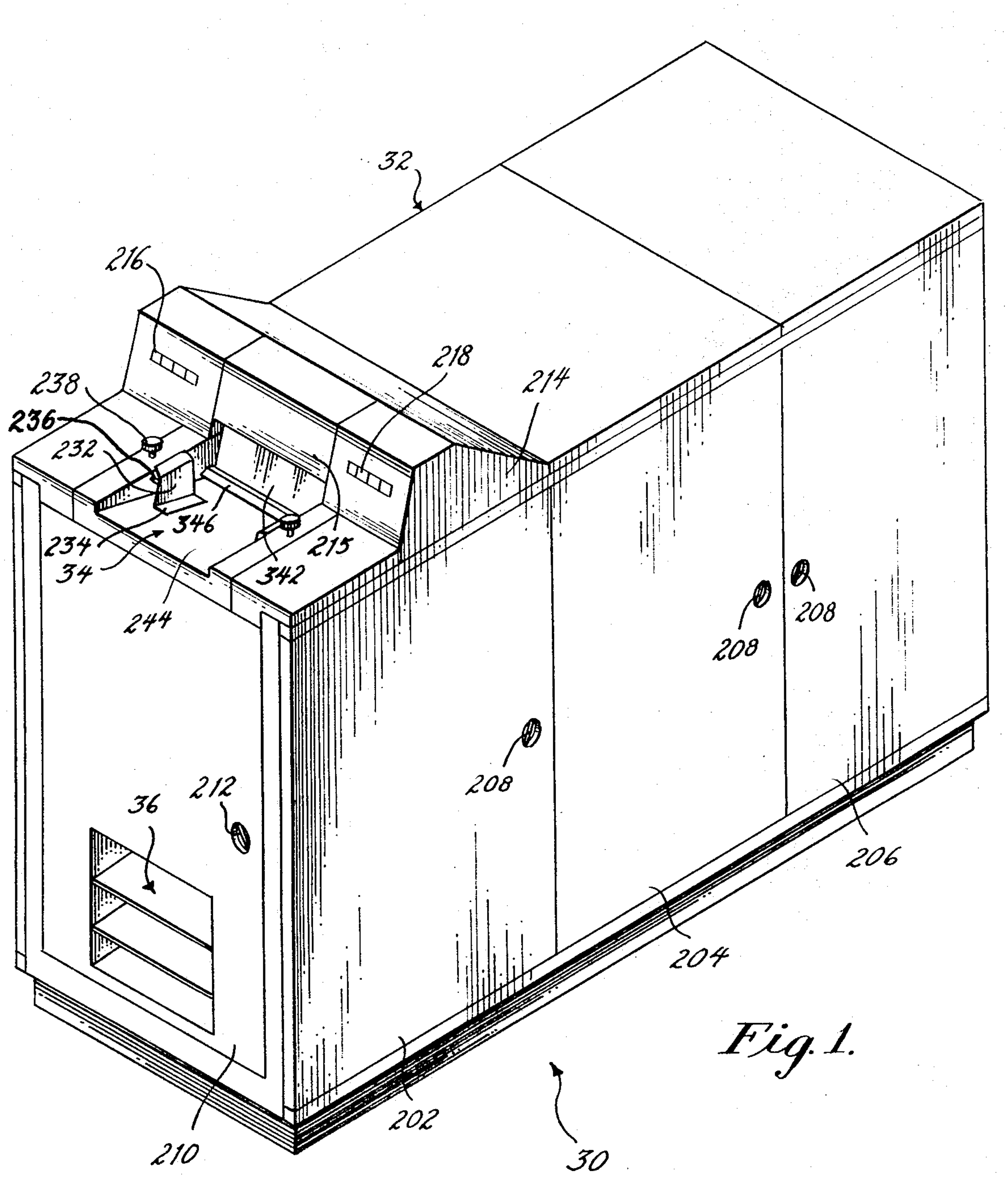
FIG. 1 is a perspective view of a character recognition system embodying the invention.

The housing 32 of the character recognition system 30 is generally rectangular and includes a plurality of doors 202, 204 and 206 on its right wall which enable access to the interior of the character recognition system for repair, cleaning, etc. Each of the doors includes a lock and handle 208. A door 210 is also provided on the front wall of the housing 32 having a handle 212 which is used for opening and locking the door. Each of the doors 202, 204, 206 and 210 are pivotable about its left vertically extending edge as seen in FIG. 1 out of the wall of the housing.

Provided adjacent the input bin 34 is an upwardly projecting trapezoidally shaped cowllike projection 214. Projection 214 includes a plurality of strips 216 and 218 of indicators, each of which displays information relative to the operation of the document handler.

Figure 3:
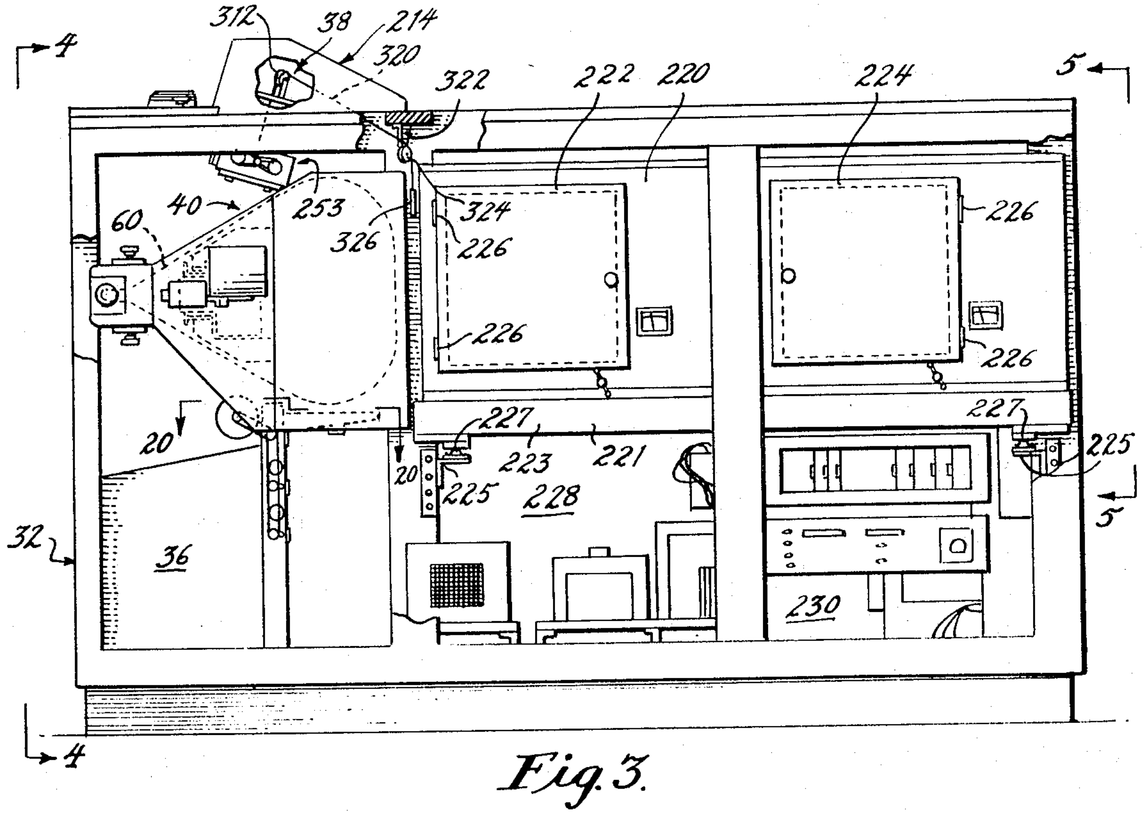
FIG. 3 is a side elevational view of the character recognition system with portions broken away for purposes of clarity with the cover panels removed.
Figure 6:
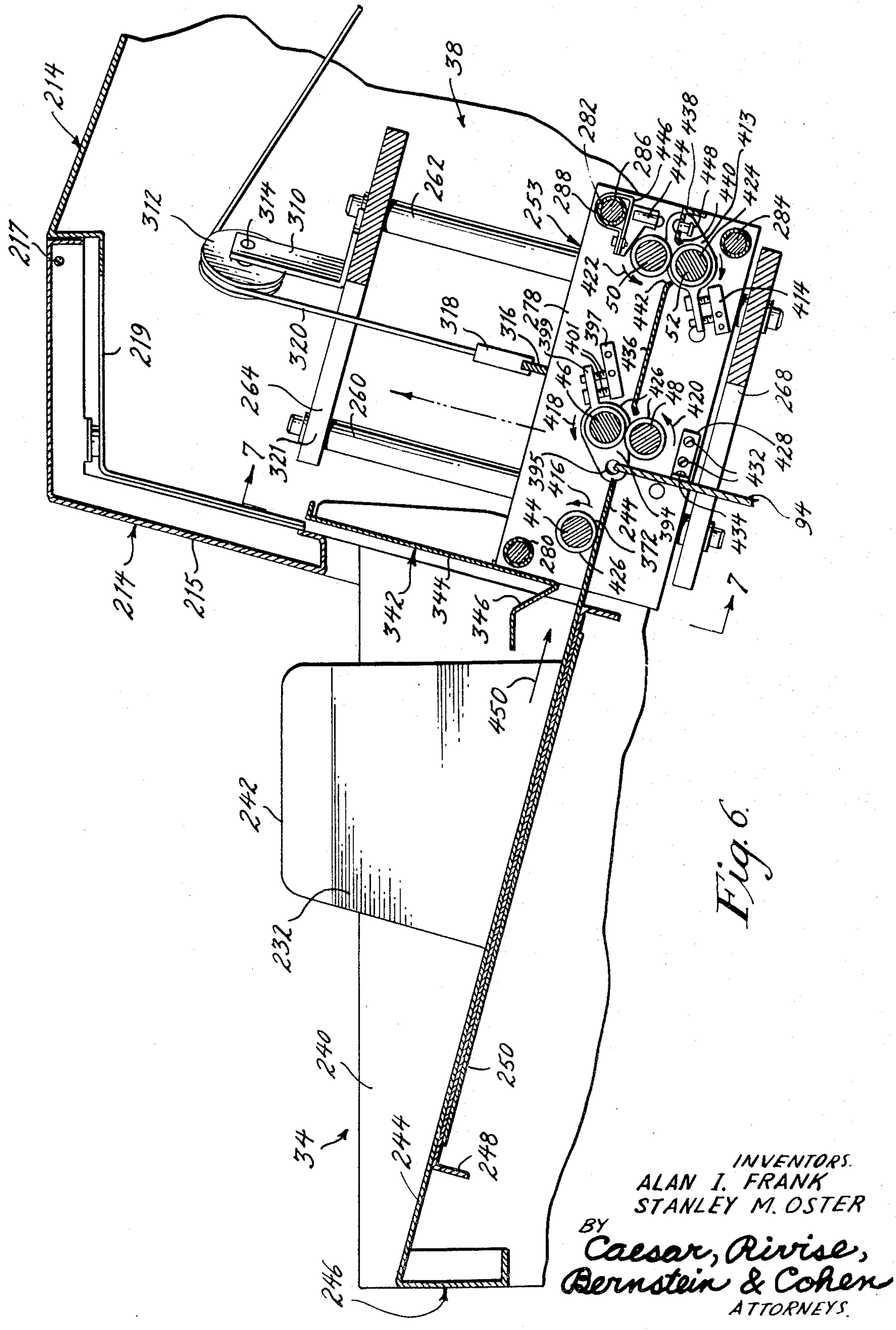
FIG. 6 is an enlarged fragmentary sectional view taken along the line 6—6 in FIG. 4 of the input feed section.

As best seen in FIGS. 3 and 6, projection 214 is hollow and houses the input feed 38. The projection 214 is provided above the document handler of the character recognition system. Projection 214 includes a pivotable access panel 215. Access panel 215 is generally L-shaped and is pivotably secured to the stationary portion of projection 214 by a pair of fasteners 217. A pair of generally L-shaped flanges 219 are provided about the opening in projection 214 in which panel 215 is pivotably mounted. Flanges 219 prevent the access panel from being pivoted inwardly of projection 214. To gain access to the top of the document handler, the access panel is gripped at the lowermost edge thereof and pivoted clockwise as seen in FIG. 6 about fasteners 217.

As best seen in FIG. 3, provided adjacent to the document handler is a housing 220 for the optical scanner and character recognition equipment. The housing 220 includes a first door 222 and a second door 224 which are pivotably secured to the housing 220 by hinges 226. These doors provide access to the optical scanner and the recognition circuitry. Both doors 222 and 224 are so constructed that the closing of the door seals off all light to the inner chamber of the compartment. The control circuitry for the scanner and the power supply are therefore provided in compartments 228 and 230 below the housing 220 of the optical scanner.

Figure 5:
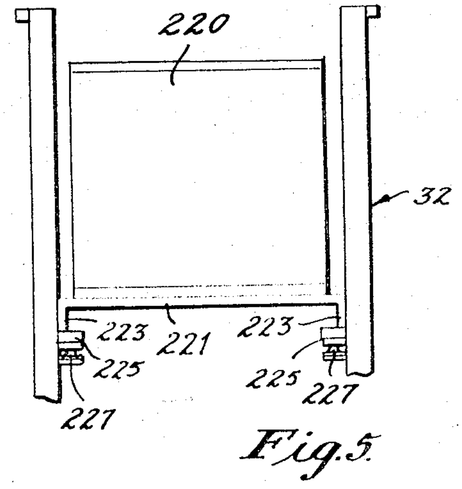
FIG. 5 is a fragmentary rear elevational view taken along the line 5—5 in FIG. 3 with cover panels removed.

Housing 220 is supported by a platform 221. As best seen in FIG. 5, platform 221 is planar and rectangular and includes a pair of longitudinally extending vertically disposed, depending skirts 223. The skirts 223 of the platform 221 rest on a plurality of mounting brackets 225 which are secured to the frame of housing 32 of the character recognition system. The mounting brackets 225 include height-adjusting members 227 for leveling platform 221.

Figure 4:
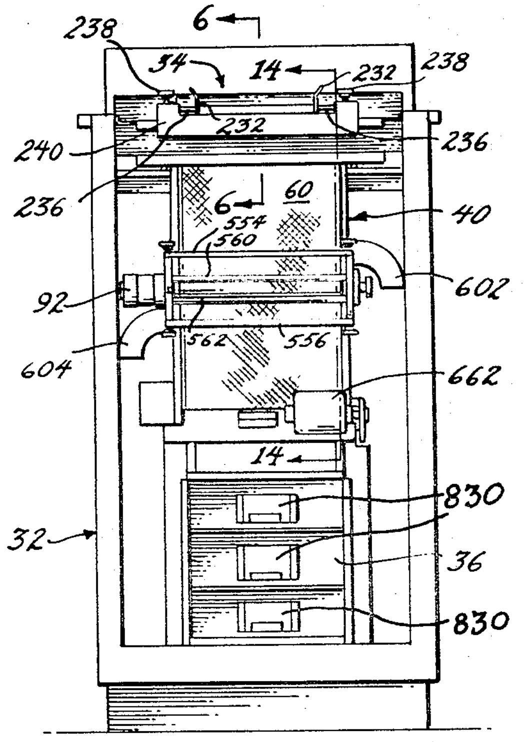
FIG. 4 is a front elevational view taken along the line 4—4 in FIG. 3 with cover panels removed.

As best seen in FIG. 4, the input bin 34 includes a pair of side guides 232. As best seen in FIG. 1 each of the side guides 232 include a rectangular base 234 which extends inwardly of the side guides 232. The side guides 232 preferably accept documents from 6 to 12 inches in width. The side guides 232 are therefore movable transversely with respect to the input bin 34. A pair of turnscrews 238 are provided in the frame 240 and extend vertically therein.

As best seen in FIG. 4, each of the side guides 232 includes an outwardly extending cylindrical rod 236. Rods 236 extend into openings provided in frame 240. The openings in frame 240 for rods 236 are provided below turnscrews 238. The turnscrews 238 act to frictionally engage the rods 236 when they are tightened and free the rods 236 for movement within the opening when they are loosened. Therefore, when turnscrews 228 are loosened, the side guides 232 are movable transversely. Tightening of the turnscrews 238 prevents movement of side guides 232. Thus, to adjust the side guides 232 for various-sized documents, the turnscrews 238 are loosened so that the guides 232 may be moved to the desired position. When the side guides 232 are positioned properly, turnscrews 238 are tightened and prevent movement of the side guides 232.

As best seen in FIG. 6, the guides each include an uppermost flange 242 which is bent outwardly at an angle with respect to the opposite side guide. The outward disposition of the flanges 242 facilitates loading documents into the input bin.

The side guides 232 of the input bin 34 are supported by a planar bed 244. The bed 244 depends angularly from the front wall 246 of the input bin 34. The front wall 246 is integral with the bed 244 which extends inwardly of the document handler and is adapted to support a pile of documents between side guides 232. A U-shaped bracket 248 is provided below the bed 244 and extends transversely between the vertical walls of the frame 240. Bracket 248 provides additional support to the bed 244. The bracket 248 is supported by inwardly extending flanges 250 which are provided on each side of frame 240 and support the bracket 248 at the longitudinally extending edges thereof.

Figures 9, 10:
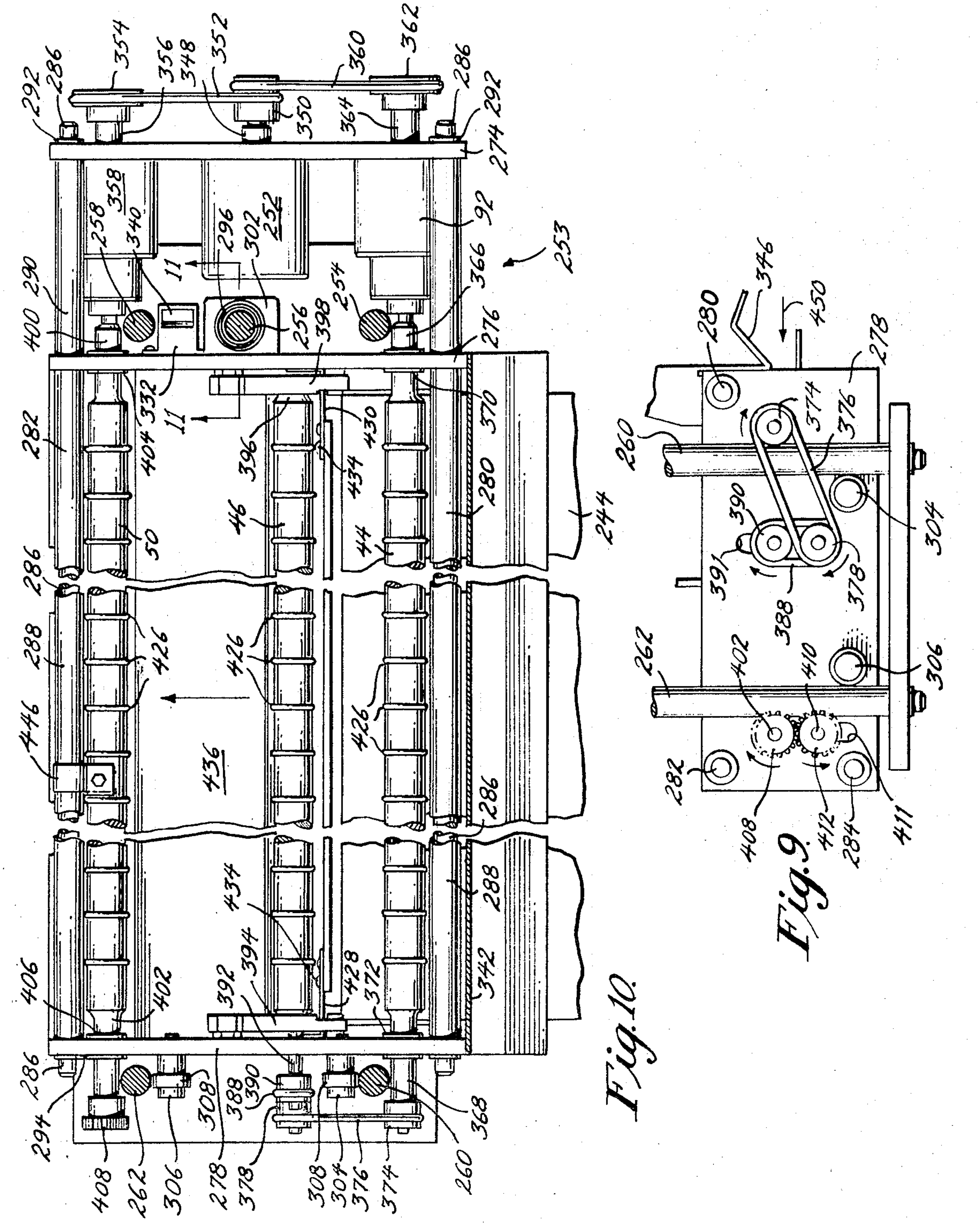
FIG. 9 is a fragmentary side elevational view taken along the line 9—9 in FIG. 7.
FIG. 10 is a sectional view taken along the line 10—10 in FIG. 7.

As set forth above and as best seen in FIG. 6, the input feed section 38 includes a plurality of rotatably shafts 44, 46, 48, 50 and 52 and a paper feed stop 94. As best seen in FIG. 10, the input feed section 38 further includes a magnetic clutch 92 and a gear motor 252 which are mounted in a housing 253 which is free to travel on a plurality of inclined guide bars 254, 256, 258, 260 and 262.

Figure 7:
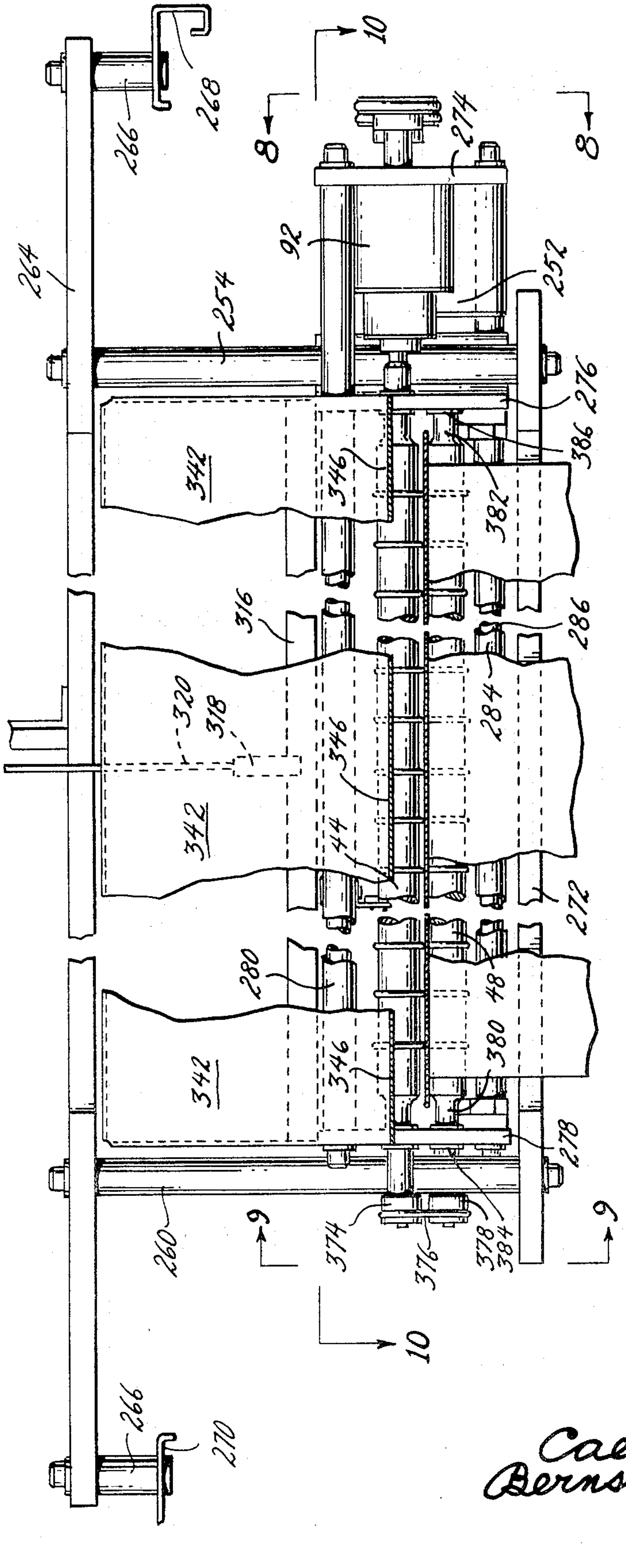
FIG. 7 is a sectional view taken along the line 7—7 in FIG. 6 with portions broken away for purposes of clarity.

The guide bars 254 through 262 are secured to a planar mounting plate 264 which is supported, as best seen in FIG. 7, by a plurality of supporting bars 266 which are mounted on the longitudinally extending horizontally disposed frame rails 268 and 270 of the housing 32 of the character recognition system 30. The guide members 254 through 262 depend at an angle and are secured to a bottom plate 272 which is planar and disposed at an angle parallel to the mounting bracket 264.

As best seen in FIG. 7, the housing 253 of the input feed assembly basically comprises three vertically extending wallplates 274, 276 and 278. The wallplates 274 through 278 are secured and spaced parallel to each other by three spacer rods 280, 282 and 284. The spacer rods extend transversely to the plates 274 through 278 and are horizontally disposed and parallel to each other.

As best seen in FIGS. 6 and 10, each of the spacer rods 280 through 284 is comprised of an inner solid rod 286 which extends through openings provided in plates 274 through 278. A first sleeve 288 is provided on each of the spacer rods 280, 282, and 284 over the inner rod 286 which extends between plate 276 and plate 278. A second sleeve 290 is provided about the rod 286 of each of the spacer rods between plates 274 and 276. Sleeves 288 are equal in size to maintain plate 276 and plate 278 parallel to each other. Sleeves 290 are all equal to each other and thereby maintain plates 274 and 276 parallel to each other. The portions of rods 286 of the spacer rods 280 through 284 are secured to plate 274 by a lockwasher 292 which is secured to the rods 286 in an annular groove provided therein. Similarly, the opposite ends of rods 286 are maintained against plate 278 by similar lockwasher 294 which are maintained against longitudinal movement along the rods by annular grooves provided in the rod adjacent the surface of plate 278.

Figure 11:
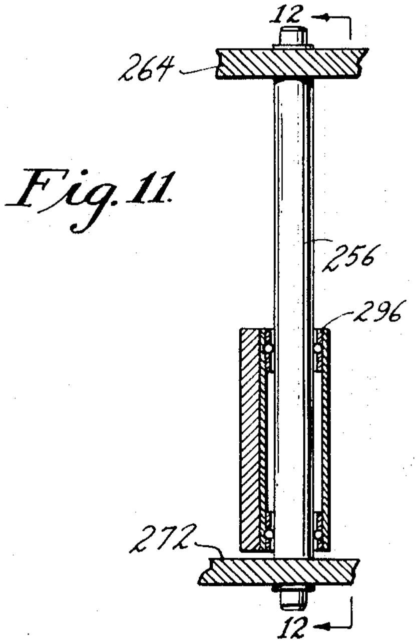
FIG. 11 is a fragmentary sectional view taken along the line 11—11 in FIG. 10.
Figure 12:
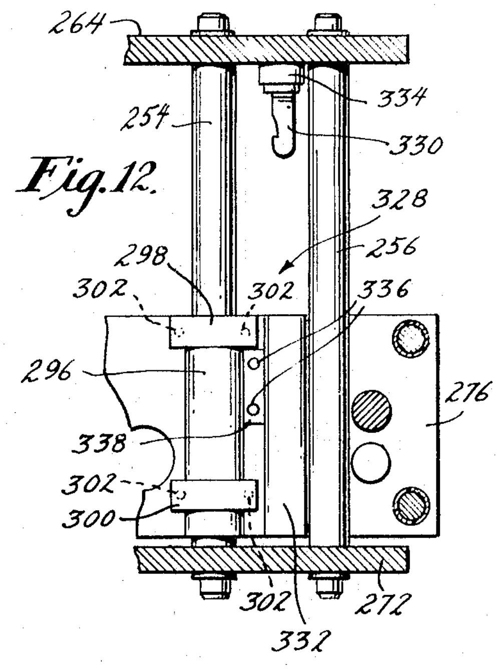
FIG. 12 is a fragmentary sectional view taken along the line 12—12 in FIG. 11.

As best seen in FIGS. 10 and 11, the housing further includes a ball bearing guide 296 which is telescoped over guide bar 256. As best seen in FIG. 12, the ball bearing guide 296 is secured to plate 276 by a pair of brackets 298 and 300 which are secured to the wall by fasteners 302. The ball bearing guide 296 enables the smooth movement of the housing 253 along guide bars 254 through 262 and maintains the disposition of the housing 253 perpendicular to the guide bars 254 through 262.

As best seen in FIGS. 9 and 10, provided in the housing 253 and secured to plate 278 are a pair of guide rollers 304 and 306. Rollers 304 and 306 are rotatably mounted to plate 278 and extend laterally outwardly of the housing. Each of the guide rollers includes an annular ball bearing surface 308 which is adapted to engage the guide bars 260 and 262. The rollers 304 and 306 act to maintain the alignment of the housing with respect to the guide bars 254 through 262 and facilitate movement of the housing along the bars.

As best seen in FIG. 6, secured to the top of mounting plate 264 is an L-shaped bracket 310, the base of which is disposed horizontally and is secured to plate 264. The vertically extending portion of bracket 310 is pivotably mounted to a pulley 312 which is pivotably mounted about a pin 314 which is press fit into an opening provided in bracket 310. A bar 316 which extends along the top of the housing 253 is secured to the top of plates 276 and 278 preferably by welding. A bracket 318 is secured to bar 316 and is secured at its opposite end to a cord 320. Cord 320 extends through a rectangular slot 321 which is provided in mounting plate 264. Bracket 318 is disposed along 316 directly above the center of gravity of housing 253. Thus, when cord 320 draws the housing 253 along guide bars 254 through 262, there is a minimum of resistance since the force applied to housing 253 by cord 320 extends through the center of gravity of the housing.

As best seen in FIG. 3, a mounting bracket 322 depends from the top wall of the housing 32 of the character recognition system and supports a rotatably mounted pulley 324. A counterweight 326 is connected to the other end of the cord 320 and is preferably of a weight substantially equal to but slightly less than the weight of the housing 253 and the contents thereof. The cord 320 extends over pulley 312 and over pulley 324 so that counterweight 326 depends vertically adjacent the transport member 40.

As best seen in FIGS. 10 and 12, the housing 253 further includes a touch latch 328 comprised of a latch finger 330 and a latch receptacle 332. The latch finger 330 depends from mounting plate 264 and is secured to the bottom surface of the mounting plate 264. The latch receptacle 332 is aligned with the latch finger 330 and is s secured to plate 276 by pairs of fasteners 336 which are threadedly secured to plate 276 and extend through flanges 338 of the latch receptacle 332.

The touch latch 328 is so constructed that when the housing 253 is moved upwardly along guide bars 254 through 262, the latch finger 330 enters an opening 340 in latch receptacle 332 and is initially locked therein. By urging the latch receptacle 332 further against the latch finger 330, the finger 330 is unlocked and the housing 253 is enabled to move away from the mounting plate 264.

As best seen in FIG. 6, secured to the forwardmost portion of the housing 253 is a lift plate 342. Lift plate 342 is secured to the forwardmost lateral edges of plates 276 and 278 of the housing 253. The lift plate 342 basically comprises a rectangular planar body section 344 which is parallel to the guide bars 254 and 260. Secured to the lowermost portion of the body section 344 of the lift plate 342 is a V-shaped flange 346 which extends horizontally along the lowermost edge of the body section 344. The V-shaped flange 346 enables manual gripping of the lift plate 342 for lifting the housing 253 along the guide bars 254 through 262.

Figure 8:
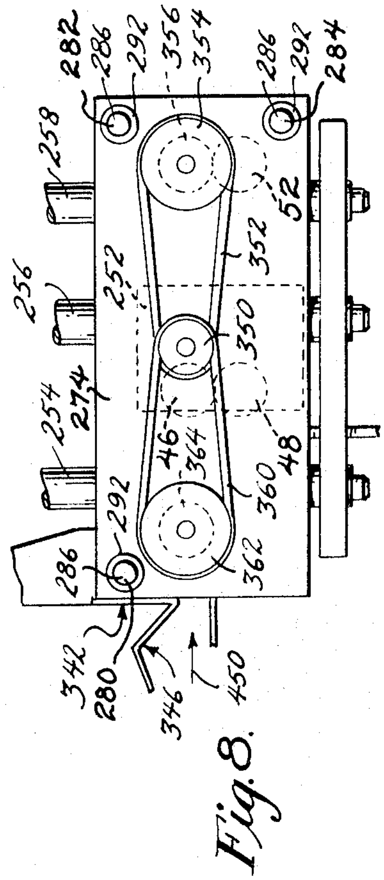
FIG. 8 is a fragmentary side elevational view taken along the line 8—8 in FIG. 7.

As best seen in FIG. 10, the gear motor 252 is secured to plate 274 adjacent the ball bearing guide 296. The gear motor 252 includes a drive shaft 348 which extends through plate 274 and is secured to a double-pulley wheel 350. As best seen in FIG. 8, pulley 350 is provided adjacent the central portion of plate 274 and is connected by a first belt 352 to a pulley 354 which is secured to a drive shaft 356 of a magnetic clutch 358. The pulley 350 is also connected via a belt 360 to a pulley 362 which is secured to drive shaft 364 of magnetic clutch 92.

As best seen in FIGS. 6, 7 and 10, shaft 44 is driven by magnetic clutch 92. Shaft 44 is disposed horizontally and extends between and through plates 276 and 278 of housing 253. Shaft 44 is substantially cylindrical and includes a pair of reduced-diameter ends 366 and 368 which extend through plates 276 and 278, respectively. Ends 366 and 368 are rotatably mounted in bearings 370 and 372, respectively, which are provided in plates 278 and 276. The magnetic clutch 92 is directly connected to end 366 of the shaft 44. End 368 of shaft 44 is connected to a pulley 374.

As best seen in FIG. 9, pulley 374 is mounted on end 386 of shaft 44 and is connected via belt 376 to pulley 378. As best seen in FIG. 7, pulley 378 is mounted on end 380 of shaft 48.

Shaft 48 is disposed parallel to shaft 44 and extends between and through plates 276 and 278. The shaft is substantially cylindrical and includes in addition to reduced end 380, reduced end 382 which extends through plate 276. Ends 380 and 382 are rotatably mounted in bearings 384 and 386, respectively, which are provided in plates 278 and 276. Shaft 48 is thus rotatably mounted within the bearings 284 and 286 of plates 278 and 276, respectively.

As best seen in FIG. 9, pulley 378 of shaft 48 is connected via belt 388 to pulley 390. As best seen in FIG. 10, pulley 390 is mounted on reduced end 392 of shaft 46. Shaft 46 is horizontally disposed, cylindrical and extends between plates 276 and 278. The shaft 46 includes the first reduced end 392 which extends from pulley 390 to the cylindrical body of shaft 46 through a slotted opening 391 in plate 278 and a bearing bracket 394 which, as best seen in FIG. 6, is pivotably secured to plate 278 by a fastening pin 395. Shaft 46 also includes a reduced end 396 which is rotatably mounted in a bearing bracket 398 which is pivotably mounted on plate 276. Shaft 46 is rotatable in the bearing brackets 394 and 398.

Bearing brackets 394 and 398 are both pivotably mounted to the plates 278 and 276, respectively, so that the spacing between shafts 46 and 48 can be adjusted by moving shaft 46. As best seen in FIG. 6, a rectangular block 397 is permanently affixed to plate 278. The bearing bracket 394 includes a lever arm 399 which includes a pair of threaded members 401 which are rotatably secured in lever arm 399 and extend to and are threadedly secured in block 397. By appropriate rotation of members 401, the bearing bracket 394 is pivoted about pin 395. Bearing bracket 398 is mounted similarly to bracket 394. Thus, by rotation of the threaded members in brackets 394 and 398, the shaft 46 can be moved with respect to shaft 48. The spacing between shafts 46 and 48 is therefore adjustable to accept different ranges of thickness of documents. A large variation in the thickness of documents presented to the document handler can therefore be accommodated.

As best seen in FIG. 10, magnetic clutch 358 is connected at its output to the reduced end 400 of shaft 50. Shaft 50 is parallel to shaft 46 and extends between and through plates 276 and 278. The shaft 50 is generally cylindrical and includes in addition to reduced end 400, reduced end 402. Reduced end 400 extends through a bearing 404 which is provided in plate 276 and end 402 extends through bearing 406 which is provided in plate 278. Spur gear 408 is mounted on end 402 of shaft 50.

As best seen in FIG. 9, spur gear 408 coacts with spur gear 412 which is mounted on reduced end 410 of shaft 52. Shaft 52 is cylindrical and includes in addition to reduced end 410, a reduced end at the opposite end thereof (not seen). The shaft 52 is disposed parallel to shafts 46, 48 and 50. Reduced end 410 extends through a slotted opening 411 (FIG. 9) in plate 278 and through a bearing bracket 413 which is secured pivotably to plate 278 in the same manner as bearing bracket 394. Bearing bracket 413 coacts with a block 414 which is permanently affixed to enable movement of shaft 52 with respect to shaft 50 in the same manner as bracket 394 coacts with block 397. The opposite end of shaft 52 is mounted in a similar bearing bracket.

As illustrated in FIG. 6, shaft 44 is caused by gear motor 252 and magnetic clutch 92 to rotate in the direction of counterclockwise arrow 416. Shaft 46 is rotated in the direction of counterclockwise arrow 418. Shaft 48 is rotated in the direction of counterclockwise arrow 420. Shaft 50 is rotated in the direction of counterclockwise arrow 422 and shaft 52 is rotated in the direction of clockwise arrow 424. Shafts 44, 46 and 48 are driven by magnetic clutch 92. Thus, when the magnetic clutch 92 is deenergized, the shaft 44 is disconnected from drive shaft 364 of magnetic clutch 92 and thereby stops rotating. Since shafts 46 and 48 are connected to shaft 44 via pulleys 374, 378 and 390, and belts 376 and 378, shafts 46 and 48 are also stopped when magnetic clutch 92 is deenergized. Shafts 50 and 52 are driven by magnetic clutch 358. Magnetic clutch 358 is continuously energized throughout the feed cycle and line increment cycle for providing continuous rotation to the shafts 50 and 52.

As best seen in FIGS. 6 and 10, each of the shafts 44 through 52 includes a plurality of elastomeric O-rings 426 which are provided at spaced intervals along the length of each of the shafts. As will hereinafter be seen, O-rings 426 act to frictionally engage the documents in order to transfer the documents from the input bin to the transport member 40. The O-rings are preferably comprised of rubber or thermoplastic resins. Molded polyurethane may also be used to provide frictional engagement between the shafts and the documents.

As best seen in FIG. 6, the bed 244 of the input bin 34 extends below shaft 44 to a point immediately adjacent but spaced from the edge of paper feed stop 94.

As best seen in FIGS. 6 and 10, feed stop 94 extends transversely to the bed 244 and is supported by a pair of L-shaped brackets 428 and 430. Brackets 428 and 430 are secured to plates 278 and 276 by threaded fasteners 432. The brackets are secured to the paper feed stop 94 by fasteners 434. Provided between the pairs of shafts 46,48 and shafts 50,52 is a platform 436. Platform 436 is parallel to the bed 244 of the input bin 34 and is secured to and extends between plates 276 and 278. Platform 436 acts to guide the documents to shafts 50 and 52 after the document exits shafts 46 and 48.

Provided beyond the platform 436 in the housing 253 is an L-shaped table 438 which extends between and is secured to plates 276 and 278. The top wall 440 of the table is aligned with and disposed in the same plane as platform 436. The platform 436 and the table 438 each include end flanges 442 which depend downwardly at an angle and facilitate movement of a document thereover without catching at an edge.

As best seen in FIG. 6, a first light source 444 (LS1) is secured to rod 282 by a mounting bracket 446. A photosensor 448 (PS1) is mounted in table 438 directly below light source 444 and directly faces the light source. As hereinbefore seen, the photosensor 448 is connected to the magnetic clutch 92 to deenergize the magnetic clutch when a document passes through shafts 50 and 52.

In operation, the housing 253 is lifted by gripping flange 346 of lift plate 342 and lifting the housing 253 until the touch latch 328 is locked. The input bin 34 is then loaded with documents that are to be read by the character recognition system 30. The side guides 232 are located to accept the size documents which are to be read and the forwardmost end of the documents abut paper feed stop 94. When the documents have been placed into the input bin 34, the flange 346 is urged upwardly thereby causing the touch latch 328 to be unlocked and thereby enables the housing 253 to be lowered.

The housing 253 moves downwardly until the O-rings 426 of shaft 44 contact the top document in the input bin 34. After the character recognition system is started, the top document is engaged by the O-rings 426 which move with shaft 44 in a counterclockwise direction and the top document is thereby moved in the direction of arrow 452.

Paper feed stop 94 is so positioned with respect to shafts 44, 46, 48 and platform 436 of the input feed that it enables the top document of a pile in the input bin 34 to pass thereover. Since the paper feed stop 94 is movable with the housing 253, the top edge of the paper feed stop 94 is always positioned adjacent the lowermost surface of the top document of the input bin. That is, since the housing 253 is stopped at the position at which O-rings 426 of shaft 44 touch the top document, the position of the top edge of the paper feed stop 94 remains constant with respect to the top of the pile of documents in the bin 34. Thus, as the pile of documents gets lower, the paper feed stop 94 moves with the shaft 44 and the remainder of the housing 253.

As the document moves in the direction of arrow 450, it is engaged by the O-rings 426 of shaft 46 which is rotating in a counterclockwise direction. If more that a single document is drawn by the shaft 44 past the paper feed stop 94, the rotation of shaft 48 in the counterclockwise direction of arrow 420 urges the lower document back towards the input bin 34. The top document is thereby urged onto platform 436 and onward to the shafts 50 and 52. Shafts 50 and 52 rotate oppositely with respect to each other and thereby act together to urge the document further in the direction of arrow 450. As the first document passes between the light source 444 and photosensor 448, the light beam is broken therebetween causing the photosensor to deenergize the magnetic clutch 92. Shafts 44, 46 and 48 stop rotation and thereby prevent a second document from immediately following the first document.

It can therefore be seen that the input feed assembly acts to positively engage a top document in the input bin and insert it into the transport member for reading by the character recognition system. The top edge of the paper feed stop 94 is set below the surface of the O-rings 426 of the shaft 44 to allow the top document to be passed into the system. The side guides 232 of the input bin are movable to accept documents between 6 and 12 inches in width.

The photosensor 448 which is provided beyond the shafts 50 and 52 causes disconnection of shafts 44, 46 and 48 from the source of rotation and thereby prevents a second document from following immediately after the first document is sent into the transport member of the character recognition system. The provision of the counterbalance for the input feed housing 253 enables the shaft 44 to bear very lightly upon the top document of a pile in the input bin to prevent undue pressure from deforming the pile and making it difficult to pass the top document over the input feed stop 94.

Figures 13, 14, 15, 16:
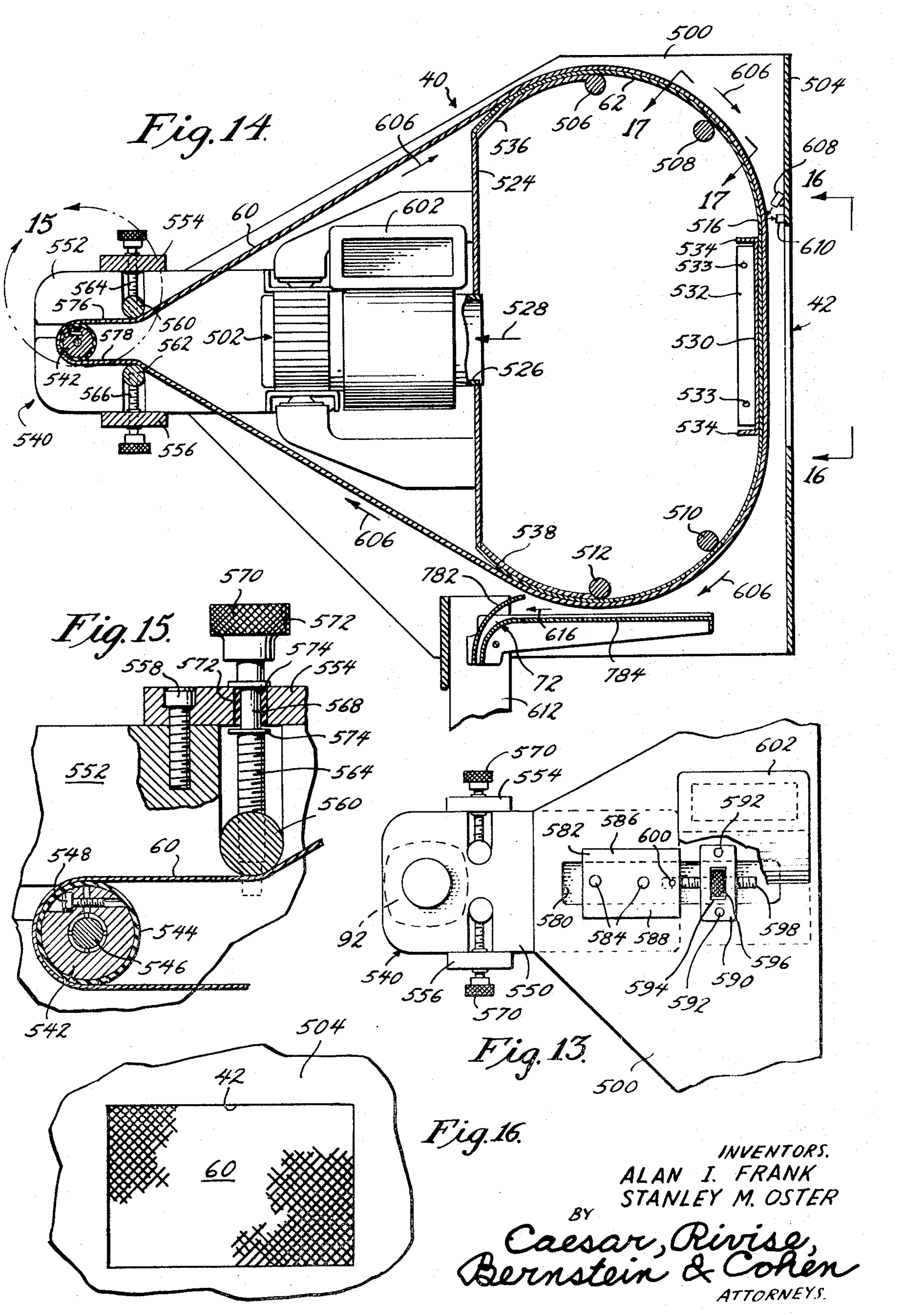
FIG. 13 is a fragmentary side elevational view of the transport member.
FIG. 14 is an enlarged sectional view taken along the line 14—14 in FIG. 4.
FIG. 15 is an enlarged fragmentary elevational view of the area shown within arrows 15 in FIG. 14.
FIG. 16 is an elevational view taken along the line 16—16 in FIG. 14.

As best seen in FIGS. 3 and 4, the transport member 40 is provided below the input bin 34. As best seen in FIG. 14, the transport member 40 includes, in addition to belt 60 and platen 62, a pair of sideplates 500 and a pair of centrifugal blowers 502. Sideplates 500 are planar, extend vertically and are connected together by an integral transversely extending vertically disposed planar bridging section 504. The sideplates 500 are secured about platen 62 by a plurality of horizontally extending spacer rods 506, 508, 510 and 512 which are secured at each end to one of the plates 500 and which maintain the platen therebetween. The shafts 506 to 512 also aid in maintaining the shape of the platen 62.

Figures 17, 25:
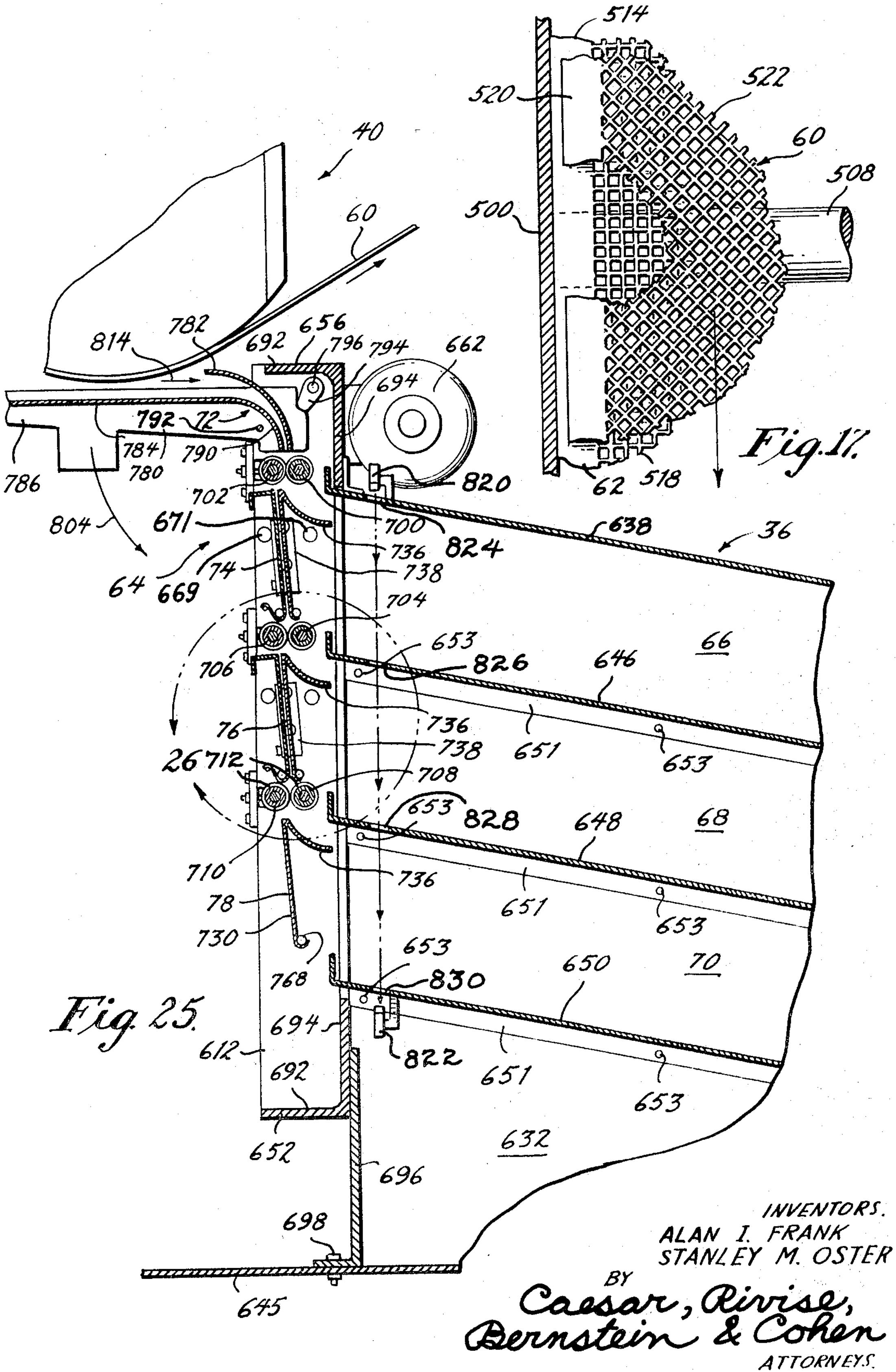
FIG. 17 is an enlarged fragmentary view taken along the line 17—17 in FIG. 14.
FIG. 25 is an enlarged sectional view taken along the line 25—25 in FIG. 24.

As best seen in FIG. 17, the arcuate portion of platen 62 is perforated. The hole pattern of the perforated portion of the platen is a straight rectangular configuration.

The platen includes a pair of imperforate side margins 514 which extend about arcuate portion 516 of the platen 62. A perforate web 518 is provided between the margin 514. The web basically comprises longitudinally and transversely extending strips which provide the straight rectangular pattern of openings in the web.

Belt 60, which rides over the platen 62, includes imperforate margins 520 and a perforate web 522 which extend along the length of the belt 60. The web 522 is comprised of strips which extend diagonally, yet perpendicular to each other to form a diagonal rectangular pattern of perforations therein. It can therefore be seen in FIG. 17 that the openings in the web 518 of platen 62 and the openings in web 522 of belt 60 are so staggered that there is constantly an open path through both the platen and the belt.

Referring to FIG. 14, the platen 62 includes, in addition to arcuate portion 516, a vertically extending plate 524 which does not include the web of perforation of the arcuate portion 516. Plate 524 includes an opening at the center thereof for the port 526 of the centrifugal blowers 502. The centrifugal blowers 502 are mounted on plate 524 and act to draw air in the direction of arrow 528 thereby creating a partial vacuum in the chamber formed between plates 500 and platen 62.

Provided at the center of the arcuate portion 516 of the platen is a perforated supporting plate 530. The plate 530 includes a pair of vertically extending side flanges 532 which are secured to sideplates 500 of the transport member 40 by suitable fasteners 533 and a pair of horizontally extending and horizontally disposed top and bottom flanges 534 which add to the rigidity of the plate 530. The plate 530 includes openings which are aligned with the openings of the web 518 of platen 62. Plate 530 is provided in order to assure the straightness of the arcuate portion 516 of the platen adjacent the read window 42 of the character recognition system.

The platen 62 further includes a pair of masks 536 and 538. Mask 536 is secured to the arcuate portion 516 of the platen 62 extending from plate 524 to shaft 506. Mask 538 is secured to arcuate portion 516 extending from plate 524 to shaft 512. Both masks 536 and 538 are imperforate and prevent the entrance of air through the perforations between the plate 524 and the shafts 506 and 512. Thus, air is enabled to pass through the arcuate portion 516 of platen 62 only between shafts 506 and 512. The belt 60 therefore rides over a partial vacuum between the shafts 506 and 512 on the platen 62.

A document is received on the belt 60 from the input feed section adjacent shaft 506. The document is thus maintained on belt 60 by the sucking action of the partial vacuum until the document is moved by the belt 60 past the shaft 512. As the document passes over the shaft 512, the mask 538 prevents the document from being sucked against the belt by the partial vacuum in the platen and the document is thereby released as the belt moves the document past the shaft 512. The weight of the document causes it to drop off the belt and start its descent toward the output bin.

As best seen in FIG. 13, plates 500 support a housing 540 for the step motor 92 and drive roller 542. Drive roller 542 is driven directly by step motor 92 and, as best seen in FIG. 15, includes a rubber cover 544 for increasing the friction between the belt 60 and the drive roller 542. Drive roller 542 is mounted on the output shaft 546 of the step motor 92 and is secured tightly thereto by a threaded fastening member 548. The roller includes a radially extending slot through which the member 548 extends transversely. The roller is thus tightened by rotation of threaded member 548, which causes the radial slot to be urged closed and the rollers grip tightened about the shaft.

The housing 540 basically comprises a pair of generally rectangular planar vertically extending plates 550 and 552 and a pair of rectangular horizontally disposed planar plates 554 and 556 which extend between plates 550 and 552 and which are secured thereto by threaded fasteners 558.

As best seen in FIG. 14, a pair of adjusting bars 560 and 562 are provided about belt 60 adjacent to the drive roller 542. Adjusting bar 560 is urged against belt 60 by a pair of adjusting screws 564 which extend through plate 554 and adjusting bar 562 is urged upwardly against the belt 60 by a pair of adjusting screws 566 which extend from plate 556.

Each of the pairs of adjusting screws 564 and 566 include integral shafts 568 which are connected to enlarged knobs 570 having knurled surfaces 572 for manual rotation thereof. The openings are provided in each of the plates 554 and 556 for the shafts 568. A bearing 572 is provided in each of the openings in plates 554 and 556. The shafts 568 have enlarged collars 574 adjacent the top and bottom surface of the plates 554 and 556 to maintain the shafts in one position relative to the plates. The shaft 568 is rotatable in the bearing 572 and screws 564 and 566 are threadedly engaged in openings provided in the adjusting bars 560 and 562.

The adjusting bars 560 and 562 increase the angle of wrap of the belt about the drive roller 542. That is, by urging the belt 60 at areas 576 and 578, as seen in FIG. 14, areas 576 and 578 of the belt 60 are parallel to each other and thus enable the belt to be in contact with he drive roller 542 over 180° of the external surface. Thus, half of the surface of the drive roller is in contact with the belt 60. If the adjusting bars 560 and 562 are not provided, the belt 60 is contacted by a smaller portion of the surface of the drive roller 542 and the frictional engagement therebetween in reduced.

The housing 540 is slidably secured to the sideplates 500 of the transport member 40. Sideplates 500 each include a transversely extending slot 580. Slots 580 are horizontally aligned with each other. The housing 540 is supported by a pair of brackets 582 which are secured to plates 550 and 552 by suitable fasteners 584. The brackets 582 are basically rectangular and planar and include an enlarged central portion which extends into slot 580. The ends 586 and 588 are of similar thickness and act to slide against the outer surface of the plate 500.

As best seen in FIG. 13, mounting bracket 590 is secured to one plate 500 over slot 580 by suitable fasteners 592. Bracket 590 includes a rectangular longitudinally extending opening 594 which extends through the bracket. A knurled threaded collar 596 is provided within opening 594. A threaded rod 598 extends transversely through the opening 594 and threaded collar 596 and is secured to the plate 582 by a suitable fastener 600.

Threaded rod 598 is threadedly secured to collar 596 and the knurled surface thereof enables rotation manually to adjust the tension on the belt 60. That is, the roller 542 is urged away from the platen 62 by rotating the collar 596 to cause the housing 540 to be moved to the left, as seen in FIG. 13, and thus tightens the tension on the belt. To loosen the tension on the belt 60, the roller 542 is drawn closer to the platen by rotating the knurled collar 596 in the opposite direction.

As best seen in FIGS. 3, 13 and 14, the blowers 502 include exhaust pipes 602 and 604. The exhausted air which is drawn through the platen 62 is vented to the lower portion of the character recognition system. The exhaust pipes 602 and 604 are arcuately shaped to exhaust the air downwardly.

The belt 60 is coated with a photographic emulsion which has been exposed to light and developed to a matte black surface. This surface is on the outside of the belt. The belt extends about the drive roller 542 underneath adjusting bar 560, over the arcuate portion 516 of platen 62, past the read window 42 of the character recognition system, underneath the platen 62, over adjusting bar 562 and back to the drive roller 542. The step motor 92 is mounted to plate 552 and shaft 546 thereof extends through plate 552 to the drive roller 542. The step motor 92 is preferably adapted to advance the belt 60 0.005 inch each time it receives an impulse. Therefore, the belt 60 is moved in the direction of arrows 606 in FIG. 14 in accordance with the number of impulses received by step motor 92. The matte black finish of the belt 60 provides a sharp contrast between the documents thereon and the belt itself.

Secured to web 504 adjacent the top edge of read window 42 is a light source (LS2) 608 and a photosensor (PS2) 610. The light source 608 and photosensor 610 act as the second pair of position sensors provided in the feed cycle of the document handler. The passing of a white document on the matte-black-finished belt 60 is sensed by the photosensor 610 as an increased amount of light is reflected from the belt 60 as the document passes the light source 608. The light source 608 is so aimed at the belt that the light therefrom is directed to be reflected towards the photosensor 610. The light source and photosensor are provided immediately adjacent the top edge of window 48 to determine the entry of the document into the read window. As best seen in FIG. 16, read window 42 in web 504 is placed directly adjacent the belt 60 as it passes over the mounting plate 530 which provides the rigidity and straightness to arcuate portion 516 of the platen 62. The document is thus substantially flat and vertically disposed as it passes read window 42. The web 504 of plates 500 is suitably secured to the housing 220 to support the transport member 40.

In operation, the shafts 50 and 52 of the input feed section direct the document onto the platen 62 adjacent the shaft 506. As the document rests on belt 60, the partial vacuum formed in the platen 62 draws the document against the belt 60 to enable securement therebetween. The document follows the belt 60 over the platen 62 past shaft 508, then past light source 608 and photosensor 610 onto the straight portion of the platen over mounting plate 530. The mounting plate 530 is also perforated thereby enabling the partial vacuum in the platen to maintain the document against the belt 60. The belt 60 then moves the document past shaft 510. When the document reaches shaft 512, the mask 538 prevents the partial vacuum from holding the document to the belt 60. The document is thereby released and heads in the direction of arrow 616 in FIG. 14 into chute 72. The document is then transferred into the output bin section by inertia and gravity.

Accordingly, a transport member 40 is provided which utilizes a belt which is controlled by a step motor 92. The step motor 92 is controlled by the character recognition system as well as by control circuitry determinative of the position of the document on the belt 60. The movement of belt 60 is thereby controlled throughout by the control system hereinbefore described. The vacuum provided in the platen 62 enables positive securement of the document as it moves with the belt 60. Moreover, the continuation of the partial vacuum past the perforated mounting plate 530 assures that the document is substantially flat when it is passing the read window 42 so that the character recognition equipment is able to read the document under the most favorable conditions. The black finish on the belt further facilitates the photosensor 610 sensing the document as it is moved adjacent thereto on the belt 60.

Figure 18:
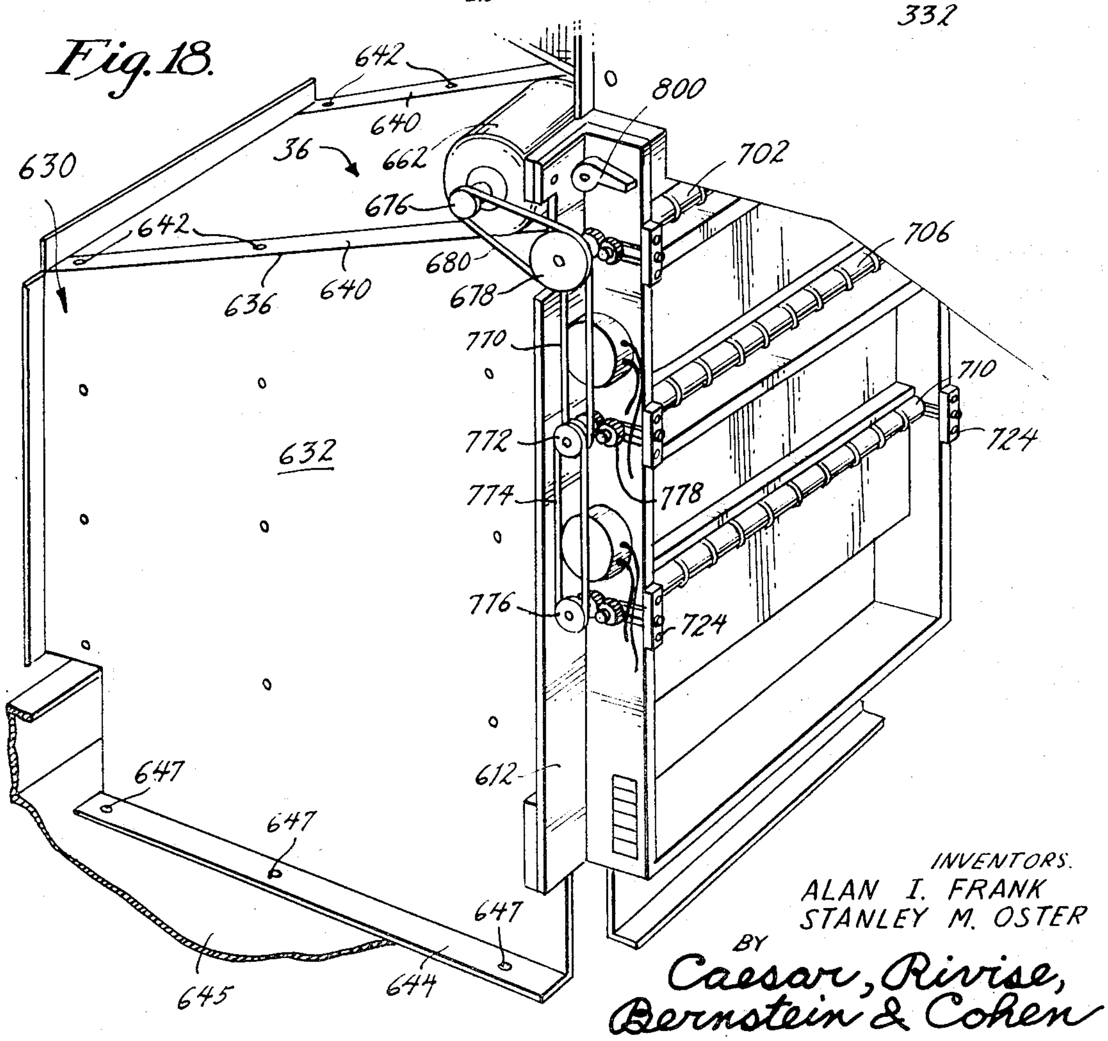
FIG. 18 is a perspective view of the document output feeder taken from the rear.
Figures 19, 24, 26:
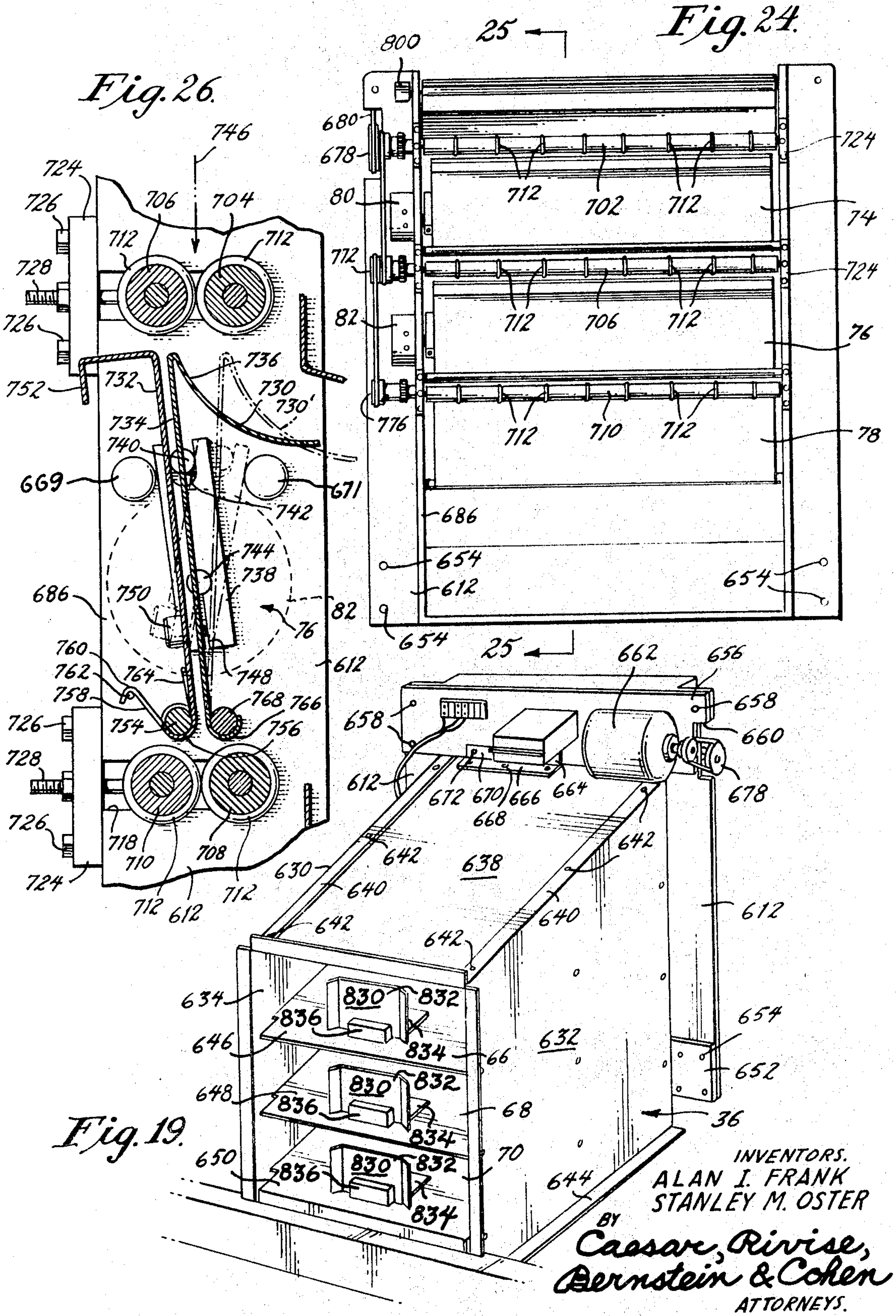
FIG. 19 is a perspective view of the output feed mechanism taken from the front.
FIG. 24 is a reduced elevational view taken along the line 24—24 in FIG. 22.
FIG. 26 is an enlarged elevational view of the area within arrows 26 in FIG. 25.

The output bin and gating section to the various compartments of the output bin are best seen in FIGS. 18 through 26. As best seen in FIGS. 18 and 19, the output bin 36 is comprised of a rectangular housing 630. Housing 630 comprises a pair of vertically extending planar walls 632 and 634. The walls 632 and 634 are generally rectangular with a top edge 636 thereof being inclined at an angle upwardly. A top wall 638 is also provided which is disposed in a plane parallel to the angle of the top edge 636 of walls 632 and 634. A top wall 638 is also provided which is disposed in a plane parallel to the angle of the top edge 636 of walls 632 and 634.

Walls 632 and 634 include flanges 640 which are perpendicular to the main body of walls 632 and 634 and extend along edge 636. Wall 638 is secured to flanges 640 of walls 632 and 634 by fasteners 642. Plates 632 and 634 each include horizontally disposed flanges 644 at their lowermost edge. Flanges 644 are secured to bottom wall 645 of the character recognition system by suitable fasteners 647.

As best seen in FIG. 19, output bin 36 further includes three shelves 646, 648 and 650. Shelves 646 through 650 are secured to and between walls 632 and 634. As best seen in FIG. 25, shelves 646 through 650 each include a pair of vertically depending flanges along their longitudinally extending edges. The flanges are secured to walls 632 and 634 by fasteners 653.

The shelves are substantially planar and are parallel to each other and spaced to form sections 66, 68 and 70 of the output bin 36. Shelf 646 is the uppermost shelf and is spaced from the top wall 638 of the output bin 36 to form section 66. Shelf 648 is spaced below shelf 646 to form section 68 and shelf 650 is spaced below shelf 648 to form the lower wall and section 70 of the output bin 36.

As best seen in FIG. 19, a horizontally extending rail 652 is secured between vertically extending rails 612. The rail 652 is secured to the rails 612 by fasteners 654. The forwardmost edges of the wall 632 and wall 634 abut the rail 652.

Figures 22, 23:
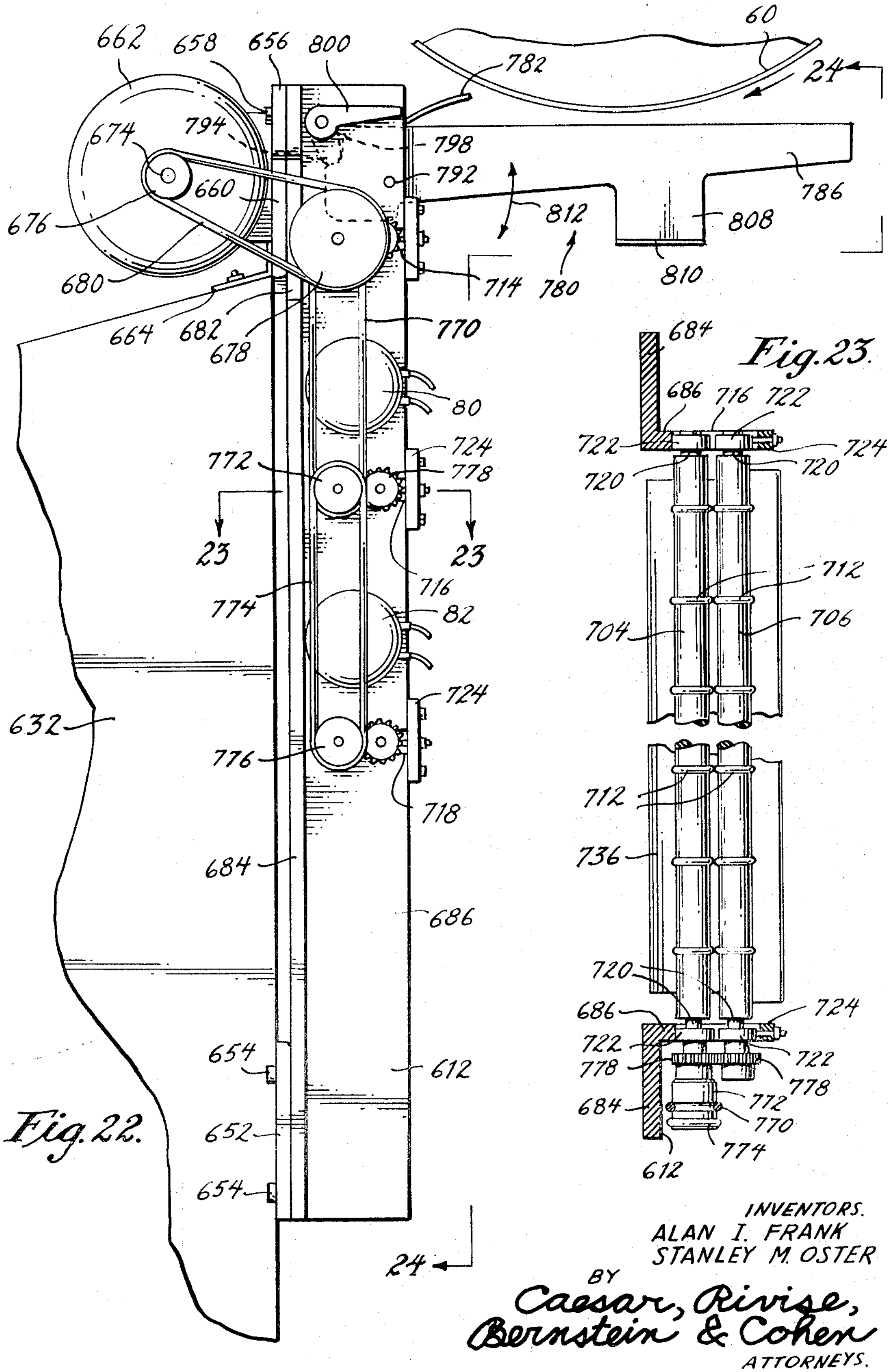
FIG. 22 is a side elevational view taken along the line 22—22 in FIG. 20.
FIG. 23 is a sectional view taken along the line 23—23 in FIG. 22.

As best seen in FIGS. 19 and 22, a mounting rail 656 which is elongated extends between rails 612 and is secured to the rails by fasteners 658. As seen in FIG. 19, a rectangular notch 660 is removed from the lower right-hand corner of the mounting rail 656. As will hereinafter be seen, the notch 660 is removed from rail 656 in order to accommodate a belt for motor 662 which is mounted to the mounting rail 656. The top wall 638 of output bin 36 is secured to mounting rail 656 by a bracket 664 which is of substantially V-shaped cross section having a first leg 666 secured by fasteners 668 to top wall 638 and leg 670 is connected via fasteners 672 to the mounting rail 656. As best seen in FIG. 22, motor 662 is mounted on rail 656 and has an output shaft 674 which has a pulley 676 mounted thereon. Pulley 676 is connected to pulley 678 by belt 680. The belt 680 extends through notch 660 and a rectangular notch 682 in rail 612.

As best seen in FIG. 22, rails 612 are each vertically disposed and include a vertically extending outwardly disposed leg 684 and a vertically extending longitudinally disposed leg 686. Rails 612 are secured together as best seen in FIG. 25 by mounting rail 656, which is L-shaped in cross section throughout a substantial portion of its length, and L-shaped bottom rail 652. Mounting rail 656 and bottom rail 652, as hereinbefore seen, are secured to rails 612 and are disposed horizontally and parallel to each other. Each of the rails 652 and 656 includes a horizontally disposed leg 692 and a vertically disposed leg 694.

As best seen in FIG. 25, motor 662 is mounted on the vertical leg 694 of mounting rail 656. The rails 612 and 652 and mounting plate 656 are supported by a bracket 696 which is secured to the bottom wall 645 by suitable fasteners 698. Bracket 696 is suitably secured to bottom rail 652. The rails 612 act to support the gating section 64 for the output bin 36.

The gating section 64 includes a first pair of rotatable shafts 704 and 702, a second pair of rotatable shafts 704 and 706, a third pair of rotatable shafts 708 and 710 and gates 74, 76 and 78. As best seen in FIG. 24, shafts 700 through 710 each include a plurality of O-rings 712 which are secured annularly about the surface of the shafts and act to frictionally engage the paper documents as they are passed through the pairs of gates 700,702; 704,706; and 708,710. Each of the shafts 700 through 710 is rotatably secured at it ends in legs 686 of rails 612.

As best seen in FIGS. 22 and 23, legs 686 of rails 612 include horizontally extending slots 714, 716 and 718 for the three pairs of shafts.

As best seen in FIG. 23, each of the cylindrical shafts 700 through 710 includes a pair of reduced ends 720 which are rotatably secured in ball bearings 722. As best seen in FIGS. 23 and 26, each of the pairs of ball bearings 722 is secured in one of slots 714, 716 or 718 by a bearing strap 724. Each bearing strap 724 is secured to the leg 686 of rails 612 by suitable fasteners 726. A threaded rod 728 extends through a threaded opening in each strap 724 and urges the bearings 722 against the opposite end of the respective slots 714, 716 or 718 in wall 686. Bearing straps 724 are each generally rectangular and extend vertically. Appropriate rotation of rod 728 acts to loosen and tighten the ball bearings 722 in the respective slots 714, 716 or 718.

As best seen in FIG. 23, bearings 722 in each pair do not touch each other but are spaced by the O-rings 712 of the shafts 708 and 710 which abut each other. As set forth hereinbefore with respect to shafts 44 through 52, gripping surfaces of a suitable thermoplastic resin such as molded polyurethane may also be secured about the periphery of the shafts 700 to 710 in place of the O-rings 712 for frictionally engaging documents.

As best seen in FIGS. 25 and 26, each of the gates 74, 76 and 78 include a paper guide 730. Gates 74 and 76 additionally include an access panel 732. Each of the paper guides 730 includes a rectangular planar panel 734 which extends substantially vertically and an integral arcuate guide member 736 which depends from the top edge of the rectangular panel 734 and which extends inwardly of the computer's output bin 36.

The paper guides 730 of gates 74 and 76 are secured at the leftmost lateral edge, as seen in FIG. 24, to a bar 738 via a rod 740. As best seen in FIG. 26, bar 738 includes a vertically extending slot 742 in which rod 740 is secured. The bar 738 is pivotably secured by a shaft 744 which extends through leg 686 of rail 612 to solenoids 80 or 82. That is, the paper guide 730 of gate 74 is pivotably secured to solenoid 80 and the paper guide 730 of gate 76 is secured to solenoid 82.

Paper guides 730 of gates 74 and 76 are normally in the position shown in full line in FIG. 26 when the solenoid 82 is not energized. When the solenoid 82 is energized, the paper guide 730 is moved to the position shown in phantom at 730′ in FIG. 26. It can therefore be seen that when the solenoid is not energized, a document flowing through shafts 704 and 706 in the direction of arrow 746 is directed towards section 68 of the output bin 36 by the guide member 736 of the paper guide 730. However, when solenoid 82 is energized and paper guide 730 is moved to the position shown at 730′, the document entering through the shafts 704 and 706 in the direction of arrow 746 is passed between the rectangular panel 734 of the paper guide 730 and the access panel 732 downward to shafts 708 and 710.

Each of the bars 738 includes an opening which is telescoped over shaft 744. The opening is connected to a narrow slot 748 which extends longitudinally to the bottom of bar 738. A threaded fastener 750 extends transversely through slot 748 and is secured in the bar 738 so that tightening of the fastener 750, closes the opening about shaft 744 to secure bar 738 to the paper guide 730.

Rectangular access panels 732 of gates 74 and 76 each includes an L-shaped flange 752 which extends horizontally along the top edge of the main body portion of the rectangular access panel 732. The rectangular access panels 732 of the gates 74 and 76 are secured to shafts 754 which are secured to and extend horizontally between the legs of rails 612.

The lowermost end of each of the rectangular access panels 732 includes a U-shaped flange 756 which is rotatably mounted about shaft 754 and is secured thereto by a spring 758. Spring 758 extends about the shaft 754 and includes a first leg 760 which is secured about a pin 762 which extends laterally out of leg 686 of rail 612. The other leg 764 is urged against the rear surface of the panel 732. The access panels 732 of gates 74 and 76 may thus be pivoted about shaft 754 so that access may be had to the gates 74 and 76. Each of the access panels of gates 74 and 76 therefore is rotatable in a counterclockwise direction about shaft 754 as shown in FIG. 26. The spring 712 acts to urge the access panel to the position shown in FIG. 26. However, by pulling the flange 752 rearwardly, the access panel 732 is rotated counterclockwise and enables access to the gates 74 and 76.

The rectangular panel 734 of the paper guide 730 of each of gates 74, 76 and 78 includes a U-shaped flange 766 which is wrapped about a shaft 768 which is horizontally disposed and which extends between and is secured to the legs 686 of rail 612. The rotation of bars 738 by the solenoids 80 and 82 causes the paper guides 730 of gates 74 and 76 to be rotated about an axis through shaft 768. The paper guide 730 of gate 78 is fixedly mounted and therefore always guides a document that reaches gate 78 into compartment 70 of the output bin 36.

The movement of bars 738 of gates 74 and 76 is limited by cylindrical laterally extending stops 669 and 671 which are provided on the inside surface of leg 686 of rail 612 adjacent each of the gates. As best seen in FIGS. 25 and 26, stops 669 are provided to the left of the bars 738 to limit the counterclockwise rotation of bars 738. Stops 771 are provided to the right of bars 738 to limit the rotation thereof in a clockwise direction.

Figures 20, 21:
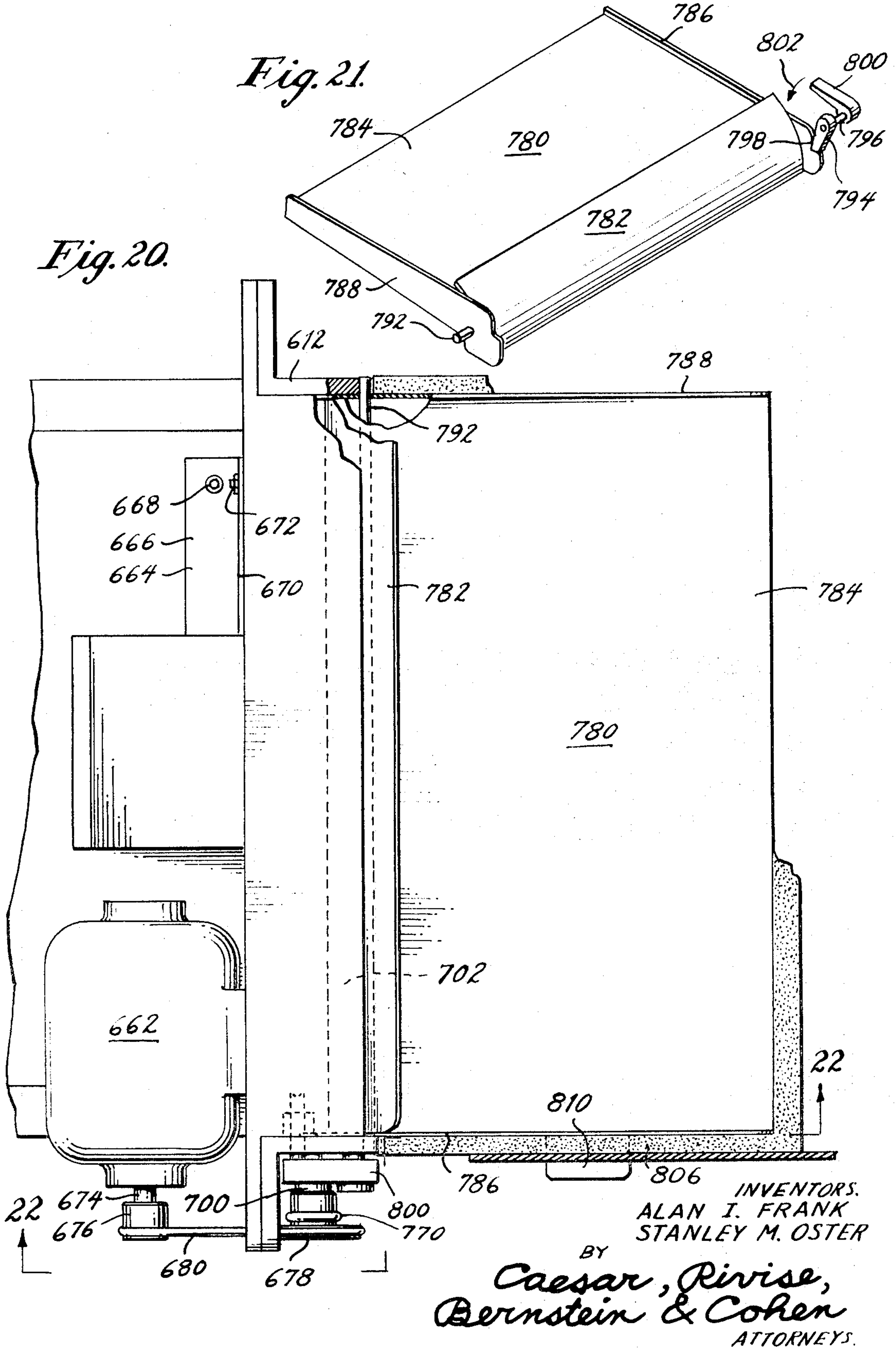
FIG. 20 is an enlarged top plan view taken along the line 20—20 in FIG. 3.
FIG. 21 is a perspective view of an output paper guide and release lever for enabling access to the transport means and output gating section of the document handler.

As best seen in FIG. 20, pulley 678 is secured to shaft 700. As seen in FIG. 22, the pulley 678 is also connected via belt 770 to pulley 772 which is secured to shaft 704. Pulley 772 is connected via belt 774 to pulley 776 which is connected to shaft 708.

As best seen in FIG. 23, each of the shafts 700 to 710 includes a spur gear 778 connected to one of the reduced portions 720 of the shafts. Spur gears 778 are interengaged so that the shafts 700 and 702 rotate in opposite directions with respect to each other. Similarly, the pairs of shafts 704,706 and 708,710 rotate in opposite directions with respect to each other. As seen in FIG. 25, the shafts 702, 706 and 710 rotate in a clockwise direction and shafts 700, 704, and 708 therefore rotate in a counterclockwise rotation. Therefore, a document sent down through each of the pairs of shafts is drawn downwardly therethrough as the O-rings 712 thereon engage the document and draw it through.

As best seen in FIGS. 20 and 25, a paper guide 780 is secured at the top of rails 612. The paper guide 780 includes chute 72 which is comprised of a top guide member 782 and a bottom guide member 784. As best seen in FIGS. 20 and 25, the top guide member 782 is an arcuate plate which is secured to planar side walls 786 and 788 of the paper guide 780. The bottom guide member 784 is substantially elongated and planar and includes an arcuate portion 790 which extends downwardly adjacent and beneath the arcuate guide member 782 to form chute 72. The bottom guide member 784 is also secured between walls 786 and 788 of the paper guide 780.

As best seen in FIG. 20, paper guide 780 includes a shaft 792 which is secured to and extends between rails 612 and through walls 786 and 788 below the arcuate portion 790 of bottom guide member 784. The paper guide 780 is pivotable about shaft 792 to enable access to the top portion of the output section in the case of a paper jam.

The paper guide 780 is locked in the position adjacent the belt 60 of transport member 40 as shown in FIG. 25 by a locking finger 794 which is rotatably mounted to a pin 796. As best seen in FIG. 21, the side wall 786 includes a notch 798 in which the locking finger 794 is engaged. The locking finger is connected via pin 796 to a lever arm 800. The lever arm 800 is spring-loaded to cause the finger 794 to be urged into notch 798 and thereby lock paper guide 780 into the position shown in FIG. 25. By rotating lever arm 800 in the direction of arrow 802 in FIG. 21, the locking finger 794 becomes disengaged from notch 798 as it is rotated about an axis through pin 796 thereby enabling the paper guide 780 to rotate about shaft 792 in the direction of arrow 804 in FIG. 25. The rotation of the paper guide 780 away from belt 60, as hereinbefore stated, enables access to the upper most portion of the output section of the document handler of the character recognition system.

As best seen in FIG. 20, a liner 806 is secured about the periphery of the paper guide 780. The liner is preferably comprised of thermoplastic foam or elastomeric material. The foam liner 806 acts to seal light out of the read window when the paper guide 780 is in the position shown in FIG. 25.

As best seen in FIG. 22, sidewall 786 of the paper guide 780 includes a depending planar member 808 having a horizontally disposed outwardly extending flange 810. Member 808 enables manual gripping of the paper guide 780 for rotation of the paper guide 780 in the direction of arrows 812 in FIG. 22. After the paper guide 780 has been rotated back to its position normal to the rail 612, the spring-loaded action of lever arm 800 causes the locking finger 794 to be urged into notch 798 of wall 786 and thereby lock the paper guide 780 in place until lever arm 800 is rotated again.

As best seen in FIG. 25, a third light source (LS3) 820 is mounted to the top wall of the output bin 36 adjacent mounting rail 656. A third photosensor (PS3) 822 is mounted to the bottom shelf 650 of the output bin 36. The light source 820 and photosensor 822 being mounted directly below the light source. Openings 824, 826, 828 and 830 are provided in the top wall of the output bin, shelf 646, shelf 648 and shelf 650, respectively. Openings 824 through 830 are vertically aligned between light source 820 and photosensor 822 so that the light from source 820 is directed therethrough and sensed by sensor 822. Whenever a document is directed into the output bin 36, the light beam is interrupted and photosensor 822 emits a signal to indicate the reception of a document.

The operation of the output section is best understood in conjunction with FIG. 25. The belt 60 transports the document in the direction of arrow 814. When the document passes over guide member 784 of paper guide 780, the belt is passed over the mask 538 (FIG. 14) and the document is thereby released into guide members 782 and 784 which form chute 72 as the document passes the end of the openings to the partial vacuum in the platen. The inertia of the document carries the leading edge of the document through chute 72 into the shafts 702 and 704 which are constantly rotated by motor 662. The O-rings 712 of shafts 702 and 704 engage the document and cause the document to continue towards gate 74.

If solenoid 80 is not energized, the guide member 736 of gate 74 directs the document into section 66 of the output bin 36. If, however, the solenoid 80 is energized, the paper guide 730 is moved to the position shown at 730′ (FIG. 26) and the document is thereby directed between the paper guide 730 and the access panel 732. The paper guide 730 and access panel 732 act to direct the movement of the document to the shafts 704 and 706. The continuously rotating shafts 704 and 706 direct the document to gate 76. If the solenoid 82 is not energized, then the guide member 736 of gate 76 guides the document into section 68 of the output bin 36.

However, if the solenoid 82 is also energized, the paper guide 730 is moved to the position shown at 730′ (FIG. 26) and causes the document to be guided between the paper guide 730 and access panel 732 of gate 76. The document is then engaged by shafts 708 and 710 and directed to gate 78. The guide member 736 of paper guide 730 of gate 78 directs the document into section 70 of the output bin 36. As hereinbefore noted, the paper guide 730 of gate 78 is stationary and thus should the solenoids 80 and 82 both be energized, the document is always directed into section 70 of the output bin 36. It should be understood that further gates may be provided where further division of documents is required. Thus, for each section of an output bin, a gate is provided, the last gate being stationary and each of the upper gates being solenoid controlled.

As best seen in FIG. 19, a plurality of paper stops 830 are provided in the output bin 36 to prevent the documents inserted into the output bin from sliding sliding completely through a section of the output bin. Paper stops 830 basically comprise a substantially planar wall 832 which extends transversely to the shelves 646, 648 and 650 of sections 66, 68 and 70 and an integral flange 834 which extends transversely to the stop 832 and rests on the shelf 646, 648 or 650. Each of the paper stops 830 includes a magnet 836 which is secured to the rear of wall 832. Magnet 836 magnetically secures the paper stops 830 to the shelves of the output bin 36. The paper stops 830 are therefore removable and/or movable within a section.

It can therefore be seen that a new and improved document handler has been provided.

The input section of the document handler utilizes a positive action input feed which assures that only a single document is fed into the character recognition system at a time. The shafts 46 and 48 which rotate in the same direction prevent a document stuck to the bottom of the top document in the input bin from being fed to the character recognition system simultaneously with the top document. Thus, documents which are placed into input bin 34 cannot be missed be being inserted into the system under a document which is being read.

The input section feeds the documents to a transport member 40 which is controlled by the character recognition system. Thus, the belt 60 is moved only when the character recognition system requires movement. The belt can therefore be moved faster than conventional belts in that the documents to not have to be read while the belt is moving. That is, by stopping the belt in the read window at the positions of each line, the scanning system is not affected by the top speed of the belt in that the document is stationary when it is being read. However, when the document is not being read, the top speed of the belt is much faster than a conventional system where the document is also read while the belt is moving.

The output section of the document handler is controlled by the character recognition system so that documents can be sorted in accordance with the information provided thereon. The documents, for example, can be sorted in accordance with the quality of the information on the document, the quality of the document itself or various other criteria.

Without further elaboration, the foregoing will so fully illustrate my invention that others may, by applying current or future knowledge, readily adapt the same for use under various conditions of service.

What we claim as the invention is:

1. A document handler for a character recognition system, said handler comprising an input bin for insertion of documents, transport means for moving said document an output bin for the reception of documents from said transport means, means for sensing the location of a document on said transport means, said character recognition system including means for reading documents at a predetermined location relative to said transport means, said transport means including means including a belt, said belt being moved in predetermined increments for transporting said document from said input bin through said predetermined location and to said output bin, said document handler operating in two modes, in a first mode, said document is moved from said input bin to said predetermined location for reading said document and a document in said predetermined location is moved to said output bin, in the other of said modes, said document is moved in increments past said location for reading said documents, said increments being determined by the information on said document with each increment being terminated with said document being stationarily fixed while said document is read at said location, said movement of said document by said transport means being controlled in accordance with the information generated by said sensing means and said character recognition system.

2. The invention of claim 1, wherein said belt is supported by a platen, said platen being hollow and including a perforated portion, said belt being perforated along its entire length, said transport means further including means for creating a partial vacuum in said platen so that a document on said belt is secured thereto by a partial vacuum in said platen.

3. The invention of claim 2 wherein said perforations in said belt are in the form of a first pattern of openings and the perforations in said platen are in a second pattern of openings, said first and second patterns being nonaligned so that there is continuously an open path through said platen and said belt as said belt passes over said platen.

4. The invention of claim 1, wherein said document handler further includes a counter and means for periodically stepping said counter, means for moving said transport means, means for disabling said moving means, said means for disabling being responsive to a predetermined count in said counter for disabling said means for moving.

5. The invention of claim 1, wherein said output bin includes a plurality of compartments, said document handler further including gates for routing said document to a select one of said compartments, said gates being controlled by the character recognition system so that said documents are sorted in accordance with data provided on said documents.

6. The invention of claim 5 wherein said criterion for separation of documents is the quality of the data in said documents.

7. The invention of claim 1, and further including an input feed for moving one document at a time from said input bin to said transport means, said input feed comprising a first cylindrical member for frictionally engaging the top document of a pile and urging it towards said transport means, and a first pair of cylindrical members spaced from said first cylindrical means towards said transport means, said first cylindrical member and said pair of cylindrical members being rotatable in the same direction, said pair of cylindrical members enabling the top document to be fed towards said transport means, but preventing any documents secured to said top document from following the same to said transport means.

8. The invention of claim 7 and further including a second pair of cylindrical members being rotatable in opposite direction, the top member of said second pair being rotatable in the same direction as said first pair of cylindrical members and the bottom cylindrical member of said second pair being rotated in the opposite direction so that said document is further forwarded to said transport means, said input feed further including a means for sensing the entry of a document through said second pair of cylindrical members for disabling the rotation of said first cylindrical member and said first pair of cylindrical members.

9. The invention of claim 1 wherein said document handler includes timing means, said timing means determining a paper-handling fault where said document is not received by said transport means in a predetermined period of time or a document is not received by said output bin from the location of said means for reading in a predetermined period of time.

10. A document handler for a character recognition system, said handler comprising an input bin for insertion of documents, transport means for moving said documents, an output bin for the reception of documents from said transport means, means for sensing the location of a document of said transport means, said character recognition system including means for reading said document at a predetermined location relative to said transport means, the movement of said document by said transport means bring controlled in accordance with the information generated by said sensing means and said character recognition system, an input feed for moving one document at a time from said input bin to said transport means, said input feed comprising a first cylindrical member for frictionally engaging the top document of a pile and urging it towards said transport means, and a first pair of cylindrical member spaced from said first cylindrical member towards said transport member, said first cylindrical member and said pair of cylindrical members being rotatable in the same direction, said pair of cylindrical members enabling the top document to be fed towards said transport member, but preventing any documents secured to said top document from following the same to said transport member, a second pair of cylindrical member being rotatable in opposite directions, said top member of said second pair being rotatable in the same direction as said first pair of cylindrical members and said bottom cylindrical member of said second pair rotated in the opposite direction so that said document is further forwarded to said transport member, said input feed further including a means for sensing the entry of a document through said second pair of shafts for disabling the rotation of said first cylindrical member and said first pair of cylindrical members, said means for sensing the entry including a light source and a photosensor facing said light source, said document interrupting the light from said light source to said photosensor when it enters therebetween.

11. Transport means for moving a document in a character recognition system, said transport means comprising a belt formed as an endless loop for moving said document, means for moving said belt, said means for moving said belt being responsive to said character recognition system and comprising a step motor which is connected to said belt, said step motor moving said belt a predetermined distance upon receiving a pulse, said character recognition system including control means for selectively actuating said means for moving said belt, said control means being responsive to information on said document for actuating said means for moving, said control means adapted to provide a predetermined number of pulses to said step motor to control the movement of said belt, said control means including a step counter, said counter being stepped by pulses, a pair of pulse generators, means for gating said pulses from said pulse generators to said step motor and said step counter, means for sensing the position of said document, said means for gating being controlled by said step counter and said means for sensing for supplying pulses to said step motor until said counter has reached a predetermined count or a document on said belt has reached a predetermined position.

12. The invention of claim 11, wherein said transport means operates in two modes, in a first mode, the first of said pulse generators is connected by said gates to both said step motor and step counter, in said second mode, said first pulse generator is connected to said step motor and the other of said pulse generators is connected to said step counter, said gates being responsive to said character recognition system for determining said mode.

13. The invention of claim 12 wherein said gating is controlled by said step counter in said first mode and said gating is controlled by said means for sensing in said second mode so that in said first mode, said belt is stopped after said counter reaches a predetermined count and in said second mode, said belt is stopped after a document reaches a predetermined position.

UNITED STATES PATENT OFFICE

CERTIFICATE OF CORRECTION

Patent No. 3,594,549 Dated July 20, 1971

ALAN I. FRANK
and
STANLEY M. OSTER

It is certified that errors appear in the above-identified patent and that said Letters Patent are hereby corrected as shown below:

(1) Column 5, line 32 "153" should be --158--.

(2) Column 5, line 39 "if" should be --in--.

(3) Column 5, line 54 "or" should be --of--.

(4) Column 10, line 51 "through" should be --throughout--.

(5) Column 12, line 70 delete "the" (second occurrence).

(6) Column 17, line 46 "sideplates" should be --side plates--.

(7) Column 19, line 69 "704" , first occurrence, should be --700--.

(8) Column 22, line 27 after "photosenser 822" insert --are mounted in vertical alignment with photosensor 822--.

(9) Claim 1, line 58 after "means", (second occurrence) delete "including means".

(10) Claim 2, line 6 "a" should be --the--.

(12) Claim 8, line 42 "direction" should be --directions--.

(13) Claim 10, line 63 "of" (second occurrence) should be --on--.

(14) Claim 10, line 73,"member" (second occurrence) should be --members--.

Signed and sealed this 15th day of February 1972.

(SEAL)
Attest:

EDWARD M.FLETCHER,JR.
Attesting Officer

ROBERT GOTTSCHALK
Commissioner of Patents